US010854112B2

(12) United States Patent
Pravong et al.

(10) Patent No.: US 10,854,112 B2
(45) Date of Patent: Dec. 1, 2020

(54) PORTABLE LAPAROSCOPIC TRAINER

(71) Applicant: Applied Medical Resources Corporation, Rancho Santa Margarita, CA (US)

(72) Inventors: Boun Pravong, Rancho Santa Margarita, CA (US); Kennii Pravongviengkham, Rancho Santa Margarita, CA (US); Lee Cohen, Rancho Santa Margarita, CA (US); Charles C. Hart, Rancho Santa Margarita, CA (US); Vivek Sikri, Cambridge, MA (US); Zoran Falkenstein, Rancho Santa Margarita, CA (US); Richard W. Conklin, Rancho Santa Margarita, CA (US); Eduardo Bolanos, Rancho Santa Margarita, CA (US); Adam Hoke, Shelbyville, MI (US); Jacob J. Filek, Rancho Santa Margarita, CA (US); Michael Palermo, Trabuco Canyon, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 509 days.

(21) Appl. No.: 15/269,113

(22) Filed: Sep. 19, 2016

(65) Prior Publication Data

US 2017/0004738 A1    Jan. 5, 2017

Related U.S. Application Data

(63) Continuation of application No. 14/270,664, filed on May 6, 2014, now Pat. No. 9,472,121, which is a
(Continued)

(51) Int. Cl.
*G09B 23/28* (2006.01)
*G09B 23/30* (2006.01)
(Continued)

(52) U.S. Cl.
CPC ............. *G09B 23/285* (2013.01); *G09B 5/02* (2013.01); *G09B 23/30* (2013.01); *G09B 23/306* (2013.01); *G09B 23/34* (2013.01)

(58) Field of Classification Search
CPC .... G09B 23/28; G09B 23/281; G09B 23/283; G09B 23/285; G09B 23/286; G09B 23/30;
(Continued)

(56) References Cited

U.S. PATENT DOCUMENTS

| 184,573 | A | 11/1876 | Becker |
| 2,127,774 | A | 8/1938 | Jacobson |

(Continued)

FOREIGN PATENT DOCUMENTS

| CA | 2 293 585 A1 | 12/1998 |
| CN | 2421706 Y | 2/2001 |

(Continued)

OTHER PUBLICATIONS

The International Bureau of WIPO, International Preliminary Report on Patentability for International Application No. PCT/US2016/036664, entitled "Hysterectomy Model," dated Dec. 21, 2017, 10 pgs.
(Continued)

*Primary Examiner* — Michael C Grant
(74) *Attorney, Agent, or Firm* — Shirin Bozorgui; Patrick Ikehara

(57) ABSTRACT

A portable surgical training device is provided. The trainer includes a top cover spaced apart from a base to form a simulated body cavity for locating model organs that are
(Continued)

substantially obscured from the field of view of the user. The top cover includes a video display, fixed insertion ports and interchangeable inserts containing simulated tissue layers. The training device has open sides for demonstrating and training lateral surgical techniques including a simulated or live tissue colon attached to a support leg for simulating transanal minimally invasive surgery. A training endoscope with an adjustable focal length for use with the trainer and, in particular, with optical trocars is disclosed. The surgical trainer can be angled and is well suited for training laparoscopic surgery techniques and demonstrating surgical instruments.

20 Claims, 14 Drawing Sheets

Related U.S. Application Data continuation of application No. 13/248,449, filed on Sep. 29, 2011, now Pat. No. 8,764,452.

(60) Provisional application No. 61/389,141, filed on Oct. 1, 2010, provisional application No. 61/476,657, filed on Apr. 18, 2011.

(51) Int. Cl.
G09B 5/02 (2006.01)
G09B 23/34 (2006.01)

(58) Field of Classification Search
CPC .... G09B 23/303; G09B 23/306; G09B 23/32; G09B 23/34; G09B 5/02
See application file for complete search history.

(56) References Cited

U.S. PATENT DOCUMENTS

| | | |
|---|---|---|
| 2,284,888 A | 6/1942 | Arneil, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,133,710 A * | 7/1992 | Carter, Jr. .............. A61B 18/00 606/28 |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A * | 4/1995 | Tuason ................ G09B 23/285 434/262 |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |

(56) References Cited

U.S. PATENT DOCUMENTS

| | | |
|---|---|---|
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2* | 7/2014 | Pravong ............ G09B 23/285 434/272 |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0138764 A1* | 7/2003 | Gil .................. G09B 23/30 434/274 |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |

(56) References Cited

U.S. PATENT DOCUMENTS

| | | |
|---|---|---|
| 2005/0008997 A1 | 1/2005 | Herman |
| 2005/0026125 A1 | 2/2005 | Toly |
| 2005/0064378 A1* | 3/2005 | Toly .................... G09B 23/285 434/262 |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 2/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1* | 7/2007 | Yarin .................... G09B 23/285 434/267 |
| 2007/0197895 A1 | 8/2007 | Nycz et al. |
| 2007/0225734 A1 | 9/2007 | Bell et al. |
| 2007/0238081 A1* | 10/2007 | Koh .................... G09B 23/285 434/262 |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2008/0317818 A1 | 12/2008 | Griffith et al. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1* | 7/2009 | Niblock ................ G09B 23/285 434/262 |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0094730 A1 | 8/2010 | Di Betta et al. |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |

(56) References Cited

U.S. PATENT DOCUMENTS

| | | |
|---|---|---|
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 | 8/1992 |
| DE | 44 14 832 | 11/1995 |
| DE | 19716341 C2 | 9/2000 |
| EP | 1 024 173 A1 | 8/2000 |
| EP | 1 609 431 A1 | 12/2005 |
| EP | 2 068 295 A2 | 6/2009 |
| EP | 2 218 570 A1 | 8/2010 |
| FR | 2 691 826 | 12/1993 |
| FR | 2 917 876 | 12/2008 |
| FR | 2 917 876 A1 | 12/2008 |
| GB | 2488994 A | 9/2012 |
| JP | 10 211160 | 8/1998 |
| JP | 2001005378 A | 1/2001 |
| JP | 2006187566 A | 7/2006 |
| JP | 2009063787 A | 3/2009 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| MX | PA 02004422 A | 11/2003 |
| MX | PA02004422 A | 11/2003 |
| PT | 106230 | 9/2013 |
| WO | WO 94/06109 A1 | 3/1994 |
| WO | WO 96/42076 A1 | 12/1996 |
| WO | WO 98/58358 A1 | 12/1998 |
| WO | WO 1999/01074 A1 | 1/1999 |
| WO | WO 2000/36577 | 6/2000 |
| WO | WO 2002/38039 A2 | 5/2002 |
| WO | WO 2002/038039 A3 | 5/2002 |
| WO | WO 2004/32095 A1 | 4/2004 |
| WO | WO 2004/082486 A1 | 9/2004 |
| WO | WO 2005/071639 A1 | 8/2005 |
| WO | WO 2005/083653 A1 | 9/2005 |
| WO | WO 2006/083963 A2 | 8/2006 |
| WO | WO 2007/068360 | 6/2007 |
| WO | WO 2008/021720 A2 | 2/2008 |
| WO | WO 2008/103383 A1 | 8/2008 |
| WO | WO 2009/000939 | 12/2008 |
| WO | WO 2009/089614 A1 | 7/2009 |
| WO | WO 2010/094730 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012168287 A1 | 12/2012 |
| WO | WO 2012175993 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |

(56) References Cited

FOREIGN PATENT DOCUMENTS

| WO | WO 2016/201085 A1 | 12/2016 |
|---|---|---|
| WO | WO 2017/031214 A1 | 2/2017 |
| WO | WO 2017/042301 A1 | 3/2017 |

OTHER PUBLICATIONS

The International Bureau of WIPO, International Preliminary Report on Patentability for International Application No. PCT/US2016/041852, entitled "Simulated Dissectible Tissue," dated Jan. 25, 2018, 12 pgs.

European Patent Office, Extended European Search Report for European Patent Application No. EP 17202365.7, titled "Gallbladder Model", dated Jan. 31, 2018, 8 pgs.

The International Bureau of WIPO, International Preliminary Report on Patentability for International Application No. PCT/US2016/043277, entitled "Appendectomy Model," dated Feb. 1, 2018, 9 pgs.

European Patent Office, The International Search Report and Written Opinion for International Application No. PCT/US2018/018036, entitled "Laparoscopic Training System," dated Jun. 8, 2018, 13 pgs.

The International Bureau of WIPO, International Preliminary Report on Patentability for International Application No. PCT/US2016/055148, entitled "Hysterectomy Model," dated Apr. 12, 2018, 12 pgs.

European Patent Office, The International Search Report and Written Opinion for International Application No. PCT/US2018/018895, entitled "Synthetic Tissue Structures for Electrosurgical Training and Simulation," dated May 17, 2018, 12 pgs.

The International Bureau of WIPO, International Preliminary Report on Patentability for International Application No. PCT/US2016/062669, entitled "Simulated Dissectible Tissue," dated May 31, 2018, 11 pgs.

European Patent Office, The International Search Report and Written Opinion for International Application No. PCT/US2017/039113, entitled "Simulated Abdominal Wall," dated Aug. 7, 2017, 13 pgs.

Society of Laparoendoscopic Surgeons, "Future Technology Session: The Edge of Innovation in Surgery, Space, and Business"0 http://www.laparoscopytoday.com/endourology/page/2/, Figure 1B: http://laparoscopy.blogs.com/laparoscopy_today/images/6-1/6-1VlaovicPicB.jpg , Sep. 5-8, 2007, 10 pgs.

Miyazaki Enterprises, "Miya Model Pelvic Surgery Training Model and Video," www.miyazakienterprises, printed Jul. 1, 2016, 1 pg.

European Patent Office, International Search Report and Written Opinion for International Application No. PCT/US2015/059668 titled "Simulated Tissue Models and Methods" dated Apr. 26, 2016, 20 pgs.

Australian Patent Office, Patent Examination Report No. 1 for Australian Application No. 2012358851 titled "Advanced Surgical Simulation" dated May 26, 2016, 3 pgs.

European Patent Office, International Search Report and Written Opinion for International Application No. PCT/US2016/032292 titled "Synthetic Tissue Structures for Electrosurgical Training and Simulation," dated Jul. 14, 2016, 11 pgs.

European Patent Office, International Search Report and Written Opinion for International Application No. PCT/US2016/018697 titled "Simulated Tissue Structures and Methods," dated Jul. 14, 2016, 21 pgs.

European Patent Office, International Search Report and Written Opinion for International Application No. PCT/US2016/034591 titled "Surgical Training Model for Laparoscopic Procedures," dated Aug. 8, 2016, 18 pgs.

European Patent Office, The International Search Report and Written Opinion of the International Searching Authority for International Application No. PCT/US2016/036664 titled "Hysterectomy Model", dated Aug. 19, 2016, 15 pgs.

The International Bureau of WIPO, International Preliminary Report on Patentability for International Application No. PCT/US2015/020574, entitled "Advanced First Entry Model for Surgical Simulation," dated Sep. 22, 2016, 9 pgs.

European Patent Office, The International Search Report and Written Opinion of the International Searching Authority for International Application No. PCT/US2016/0043277 titled "Appendectomy Model", dated Oct. 4, 2016, 12 pgs.

The International Bureau of WIPO, International Preliminary Report on Patentability for International Application No. PCT/US2015/022774, titled "Simulated Dissectible Tissue," dated Oct. 6, 2016, 9 pgs.

European Patent Office, The International Search Report and Written Opinion of the International Searching Authority for International Application No. PCT/US2016/041852 titled "Simulated Dissectible Tissue", dated Oct. 13, 2016, 12 pgs.

3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx__3.pdf , printed Aug. 23, 2016, pp. 1-6.

3D-Med Corporation, "Loops and Wire #1" https://www.3-dmed.com/product/loops-and-wire-1 , printed Aug. 23, 2016, 4 pgs.

Barrier, et al., "A Novel and Inexpensive Vaginal Hysterectomy Simulatory, " Simulation in Healthcare: The Journal of the Society for Simulation in Healthcare, vol. 7, No. 6, Dec. 1, 2012, pp. 374-379.

European Patent Office, Invitation to Pay Additional Fees for International Application No. PCT/US2016/062669, titled "Simulated Dissectible Tissue", dated Feb. 10, 2017, 8 pgs.

European Patent Office, The International Search Report and Written Opinion of the International Searching Authority for International Application No. PCT/US2016/055148 titled "Hysterectomy Model", dated Feb. 28, 2017, 12 pgs.

The International Bureau of WIPO, International Preliminary Report on Patentability for International Application No. PCT/US2016/018697, entitled "Simulated Tissue Structures and Methods," dated Aug. 31, 2017, 14 pgs.

European Patent Office, Examination Report for European Application No. 14733949.3 titled "Gallbladder Model," dated Dec. 21, 2016, 6 pgs.

European Patent Office, The International Search Report and Written Opinion of the International Searching Authority for International Application No. PCT/US2016/062669 titled "Simulated Dissectible Tissue," dated Apr. 5, 2017, 19 pgs.

European Patent Office, The International Search Report and Written Opinion of the International Searching Authority for International Application No. PCT/US2017/020389 titled "Simulated Tissue Cartridge", dated May 24, 2017, 13 pgs.

The International Bureau of WIPO, International Preliminary Report on Patentability and Written Opinion for International Application No. PCT/US2015/059668, entitled "Simulated Tissue Models and Methods," dated May 26, 2017, 16 pgs.

European Patent Office, International Search Report for International Application No. PCT/US2011/053859 A3, dated May 4, 2012, entitled "Portable Laparoscopic Trainer".

European Patent Office, The International Search Report and Written Opinion for International Application No. PCT/US2012/60997, dated Mar. 7, 2013, entitled "Simulated Tissue Structure for Surgical Training".

European Patent Office, The International Search Report and Written Opinion for International Application No. PCT/US2012/070971, dated Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, dated Jan. 22, 2014, entitled "Surgical Training Model for Laparoscopic Procedures".

(56) References Cited

OTHER PUBLICATIONS

European Patent Office, The International Search Report and Written Opinion for International Application No. PCT/US2013/061949, dated Feb. 17, 2014, entitled "Surgical Training Model for Laparoscopic Procedures".
Anonymous: Realsim Systems—LTS2000, Sep. 4, 2005, pp. 1-2, XP055096193, Retrieved from the Internet: URL:https://web.archive.org/web/2005090403;3030/http://www.realismsystems.com/exersizes.htm (retrieved on Jan. 14, 2014).
European Patent Office, The International Search Report and Written Opinion for International Application No. PCT/US2013/062269, dated Feb. 17, 2014, entitled "Surgical Training Model for Transluminal Procedures".
European Patent Office, The International Search Report and Written Opinion for International Application No. PCT/US2013/061557, dated Feb. 10, 2014, entitled "Surgical Training Model for Laparoscopic Procedures".
European Patent Office, The International Search Report and Written Opinion for International Application No. PCT/US2013/061728 dated Oct. 18, 2013, entitled "Surgical Training Model for Laparoscopic Procedures".
European Patent Office, The International Search Report and Written Opinion for International Application No. PCT/US2012/070971, dated Jul. 4, 2014, entitled "Advanced Surgical Simulation Constructions and Methods".
The International Bureau of WIPO, International Preliminary Report on Patentability for International Application No. PCT/US2012/070971, titled "Advanced Surgical Simulation" dated Jun. 24, 2014.
The International Bureau of WIPO, International Preliminary Report on Patentability for International Application No. PCT/US2012/060997, titled "Simulated Tissue Structure for Surgical Training" dated Apr. 22, 2014.
European Patent Office, International Search Report and Written Opinion for International Application No. PCT/US2013/053497 titled "Simulated Stapling and Energy Based Ligation for Surgical Training" dated Nov. 5, 2013.
The International Bureau of WIPO, International Preliminary Report on Patentability for international application No. PCT/US2013/061728, titled Surgical Training Model for Laparoscopic Procedures, dated Apr. 9, 2015.
The International Bureau of WIPO, International Preliminary Report on Patentability for International Application No. PCT/US2013/062363, titled Surgical Training Model for Laparoscopic Procedures, dated Apr. 9, 2015.
The International Bureau of WIPO, International Preliminary Report on Patentability for International Application No. PCT/US2013/062269, titled Surgical Training Model for Laparoscopic Procedures, dated Apr. 9, 2015.
The International Bureau of WIPO, International Preliminary Report on Patentability for International Application No. PCT/US2013/061557, titled Surgical Training Model for Laparoscopic Procedures, dated Apr. 9, 2015.
The International Bureau of WIPO, International Preliminary Report on Patentability for International Application No. PCT/US2013/061949, titled Surgical Training Model for Laparoscopic Procedures, dated Apr. 9, 2015.
European Patent Office, The International Search Report and Written Opinion for International Application No. PCT/US2014/042998, title; Gallbladder Model, dated Jan. 7, 2015.
The International Bureau of WIPO, International Preliminary Report on Patentability, for PCT application No. PCT/US2013/053497, titled, Simulated Stapling and Energy Based Ligation for Surgical Training, dated Feb. 12, 2015.
European Patent Office, The International Search Report and Written Opinion for International Application No. PCT/US2015/020574, titled "Advanced First Entry Model for Surgical Simulation," dated Jun. 1, 2015.
European Patent Office, The International Search Report and Written Opinion for International Application No. PCT/US2015/022774, dated Jun. 11, 2015 entitled "Simulated Dissectible Tissue."
Limps and Things, EP Guildford MATTU Hernia Trainer, http://limbsandthings.com/us/products/tep-guildford-mattu-hernia-trainer/.
Simulab, Hernia Model, http://www.simulab.com/product/surgery/open/hernia model.
McGill Laparoscopic Inguinal Hernia Simulator, Novel Low-Cost Simulator for Laparoscopic Inguinal Hernia Repair.
University of Wisconsin-Madison Biomedical Engineering, Inguinal Hernia Model, http://bmedesign.engr.wisc.edu/projects/s10/hernia_model/.
European Patent Office, The International Search Report and Written Opinion of the International Searching Authority for International Application No. PCT/US2014/038195 titled "Hernia Model", dated Oct. 15, 2014.
European Patent Office, The International Search Report and Written Opinion of the International Searching Authority for International Application No. PCT/US2014/048027 titled "First Entry Model", dated Oct. 17, 2014.
Kurashima Y et al, "A tool for training and evaluation of Laparoscopic inguinal hernia repair; the Global Operative Assessment of Laparoscopic Skills-Groin Hernia" American Journal of Surgery, Paul Hoeber, New York, NY, US vol. 201, No. 1, Jan. 1, 2011, pp. 54-61 XP027558745.
Anonymous: Silicone rubber-from Wikipedia, the free encyclopedia, pp. 1-6, XP055192375, Retrieved from the Internet: URL:http://en.wikipedia.org/w.index.php?title=Silicone rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/019840, titled Simulated Tissue Structure for Surgical Training, dated Sep. 11, 2015.
The International Bureau of WIPO, International Preliminary Report on Patentability for International Application No. PCT/US2014/038195, titled Hernia Model, dated Nov. 26, 2015.
The International Bureau of WIPO, International Preliminary Report on Patentability for International Application No. PCT/US2014/042998, titled "Gallbladder Model" dated Dec. 30, 2015.
The International Bureau of WIPO, International Preliminary Report on Patentability for International Application No. PCT/US2014/048027, titled "First Entry Model" dated Feb. 4, 2016.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," dated Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.

(56) References Cited

OTHER PUBLICATIONS

The International Bureau of WIPO, International Preliminary Report on Patentability for International Application No. PCT/US2017/039113, entitled "Simulated Abdominal Wall," dated Jan. 10, 2019, 8 pgs.

European Patent Office, Extended European Search Report for European Patent Application No. EP 18210006.5, titled "Surgical Training Model for Laparoscopic Procedures," dated Jan. 21, 2019, 7 pgs.

European Patent Office, Extended European Search Report for European Patent Application No. EP 18207214.0, titled "Synthetic Tissue Structures for Electrosurgical Training and Simulation," dated Mar. 28, 2019, 6 pgs.

European Patent Office, Extended European Search Report for European Patent Application No. EP 18216002.8, titled "Surgical Training Model for Laparoscopic Procedures," dated Apr. 2, 2019, 6 pgs.

European Patent Office, Extended European Search Report for European Patent Application No. EP 18216005.1, titled "Surgical Training Model for Laparoscopic Procedures," dated Apr. 2, 2019, 7 pgs.

European Patent Office, Extended European Search Report for European Patent Application No. EP 19159065.2, titled "Simulated Tissue Structures and Methods," dated May 29, 2019, 8 pgs.

The International Bureau of WIPO, International Preliminary Report on Patentability for International Application No. PCT/US2018/018036, entitled "Laparoscopic Training System," dated Aug. 29, 2019, 8 pgs.

The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.

European Patent Office, Extended European Search Report for European Patent Application No. EP 20153338.7, titled "Advanced Surgical Simulation Constructions and Methods," dated Mar. 5, 2020, 7 pgs.

European Patent Office, Extended European Search Report for European Patent Application No. EP 19215545.5, titled "Advanced First Entry Model for Surgical Simulation," dated Mar. 26, 2020, 8 pgs.

European Patent Office, Extended European Search Report for European Patent Application No. EP 20158500.7, titled "Surgical Training Device," dated May 14, 2020, 9 pgs.

"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/ Surgical_Female_Pelvic_Trainer_SFPT_with_Advanced_Uterus_User_Guide.pdf, retrieved Feb. 21, 2020, 2 pgs.

\* cited by examiner

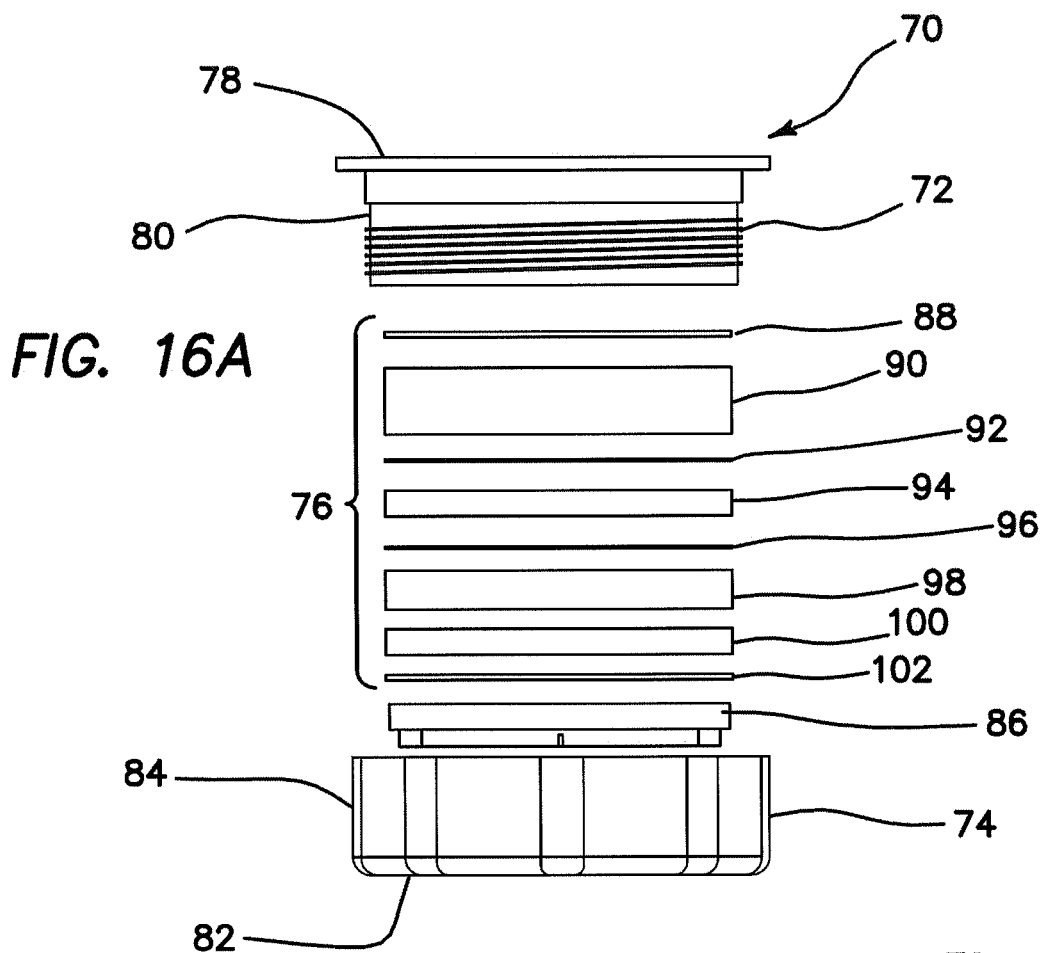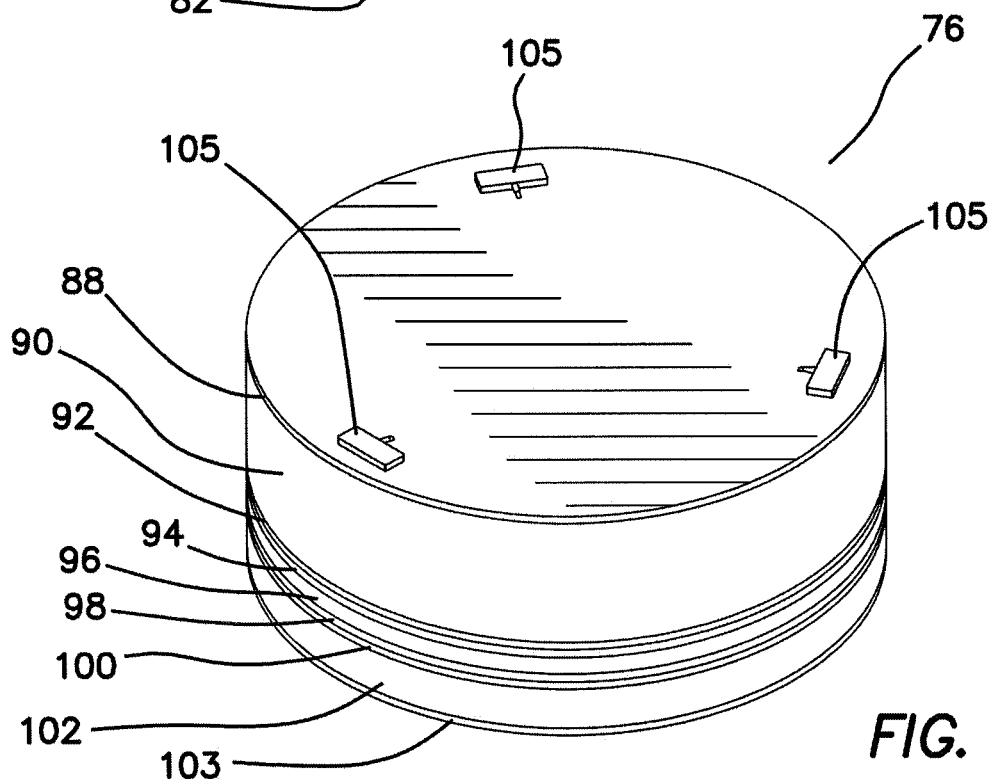

PORTABLE LAPAROSCOPIC TRAINER

CROSS-REFERENCE TO RELATED APPLICATIONS

This application is a continuation of U.S. application Ser. No. 14/270,664 filed on May 6, 2014 entitled "Portable laparoscopic trainer" which claims priority of U.S. application Ser. No. 13/248,449 filed on Sep. 29, 2011 now U.S. Pat. No. 8,764,452 issued on Jul. 1, 2014 entitled "Portable laparoscopic trainer" which claims priority to and benefit of U.S. Provisional Patent Application Ser. No. 61/389,141 entitled "Portable pelvic trainer" filed on Oct. 1, 2010 and U.S. Provisional Patent Application No. 61/476,657 entitled "Portable laparoscopic trainer" filed on Apr. 18, 2011, all of which are incorporated herein by reference in their entirety.

FIELD OF THE INVENTION

This application is generally related to surgical training tools, and in particular, to simulators for teaching and practicing various surgical techniques and procedures related to laparoscopic, abdominal, and transanal minimally invasive surgery.

BACKGROUND OF THE INVENTION

Simulated wound pelvic trainers are gaining interest in the field of laparoscopy as they provide a functional, inexpensive and practical means to train surgeons and residents the basic skills and typical techniques used in laparoscopic surgery such as grasping, manipulating, cutting and tying knots as well as how to perform specific surgical procedures such as colectomies and cholecysectomies that utilize these basic skills. Trainers are also effective sales tools for demonstrating medical devices.

It can be appreciated that both the basic laparoscopic skills, as well as surgical procedures themselves, can be practiced in a non-surgical setting. It has been demonstrated that the use of simulation trainers greatly enhances the skill levels of new laparoscopists, and are a great tool to train future surgeons in a non-surgical setting. There is a need for improved, realistic and effective surgical trainers.

SUMMARY OF THE INVENTION

The present invention generally provides a modular pelvic simulation trainer that accommodates different insert modules to facilitate training on a wide variety of minimally invasive surgical procedures, including, for example, the insertion of trocars, performing minimally invasive procedures through trocars, hand-assisted access devices, and single-site port devices.

According to one aspect of the invention, a surgical training device is provided. The training device comprises a base and a top cover that is connected to and spaced apart from the base by at least one leg to define an internal cavity between the top cover and the base. The training device has substantially open sides and further includes a first insert connected to the top cover. The first insert has a top portion removably connected to a bottom portion to form an encasement having an opening in the top portion and an opening in the bottom portion. The encasement houses a removable insert material that simulates human tissue. The insert material is disposed between the top portion and the bottom portion of the first insert providing a penetrable tissue simulation region for accessing the internal cavity.

According to another aspect of the invention, a surgical training device is provided. The surgical training device comprises a base and a top cover connected to and spaced apart from the base to define an internal cavity between the top cover and the base. At least one leg interconnects and spaces apart the top cover and base. The at least one leg has an aperture facing the internal cavity. The surgical training device further includes a tube having a proximal end and a distal end. The proximal end of the tube is interconnected with the aperture such that the aperture provides an access port to the lumen of the tube. The distal end of the tube extends into the internal cavity and is suspended within the internal cavity.

According to another aspect of the invention, a sleeve or endoscope tip is provided that, when coupled to the camera, facilitates the rapid change in focal depth of the camera, thus enabling a single, simple and cost effective camera to be used to focus both on the interior of the trainer, for monitoring simulated laparoscopic procedures, and on the tip of an instrument, as for example, monitoring the insertion of a trocar through a simulated abdominal wall.

BRIEF DESCRIPTION OF THE DRAWINGS

FIG. 16A illustrates an exploded side view of an insert according to the present invention.

FIG. 16B illustrates a top perspective view of an insert material according to the present invention.

DETAILED DESCRIPTION OF THE INVENTION

Hand-access devices, single-port devices and retraction devices similar to embodiments disclosed herein are disclosed in U.S. Pat. Nos. 7,473,221, 6,958,037, 7,650,887, U.S. Published Patent Application No. 2009-0187079, and U.S. Published Patent Application No. 2010-0094227, the disclosures of which are incorporated herein by reference in their entireties.

Figure 1:
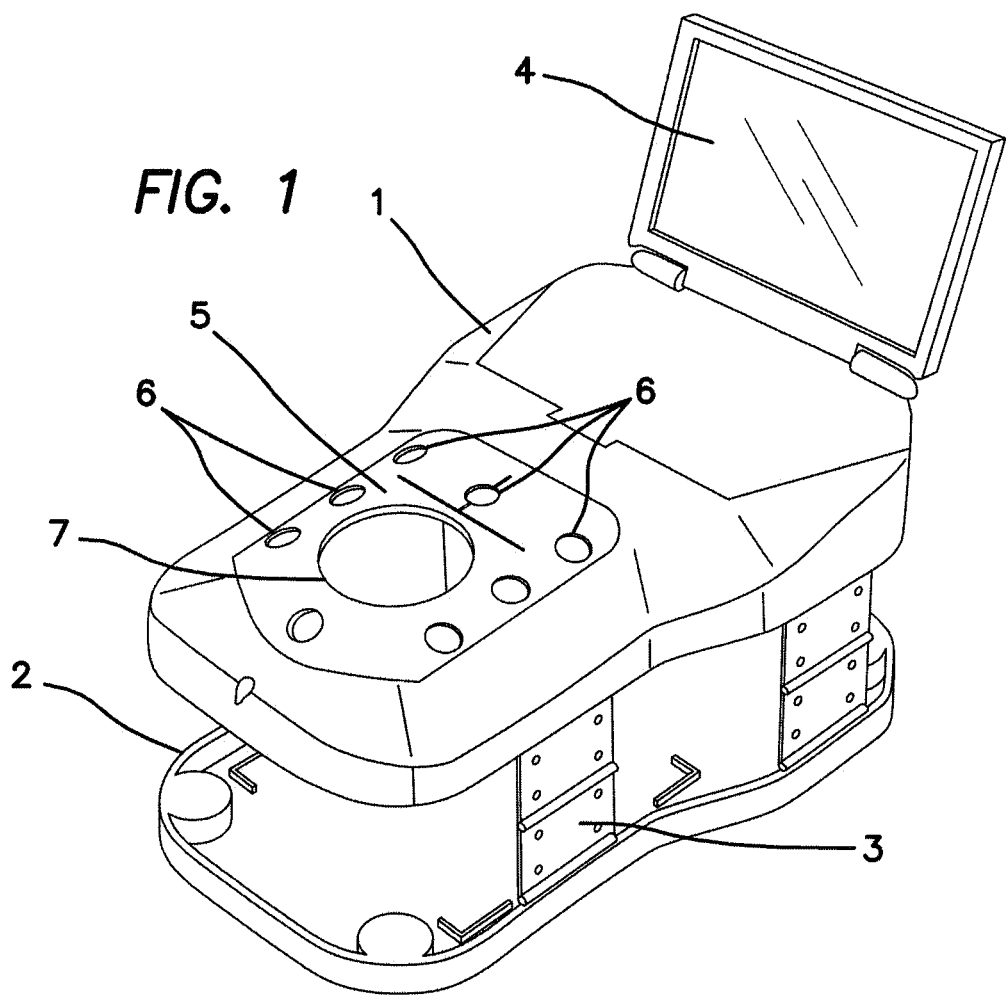
FIG. 1 illustrates a top perspective view of a surgical training device according to the present invention.

FIG. 1 shows one embodiment of the disclosed portable pelvic/laparoscopic trainer, comprising a torso-shaped top cover 1, which is connected to a bottom plate or base 2 through collapsible hinges 3. A monitor 4 is attached to the top cover 1 and can be folded against the top cover 1 for portability or storage in a low-profile orientation.

Also shown in FIG. 1 is one embodiment of an insert 5 that fits into an opening in the top cover 1. In this embodiment, the insert 5 has multiple, fixed apertures 6, which optionally function as trocar or surgical instrument insertion sites, as well as one large opening 7, into which a hand-access device, single-site device or tissue simulation region may be inserted. The insert 5 is formed from a material having sufficient strength and rigidity to provide mechanical support for the hand access or single-site device during use. One preferred material is a hard plastic, which provides sufficient rigidity and strength, but which is light weight for easy portability of the trainer unit. In another variation, the apertures 6 and opening 7 are formed directly in the top cover 1.

Figure 2:
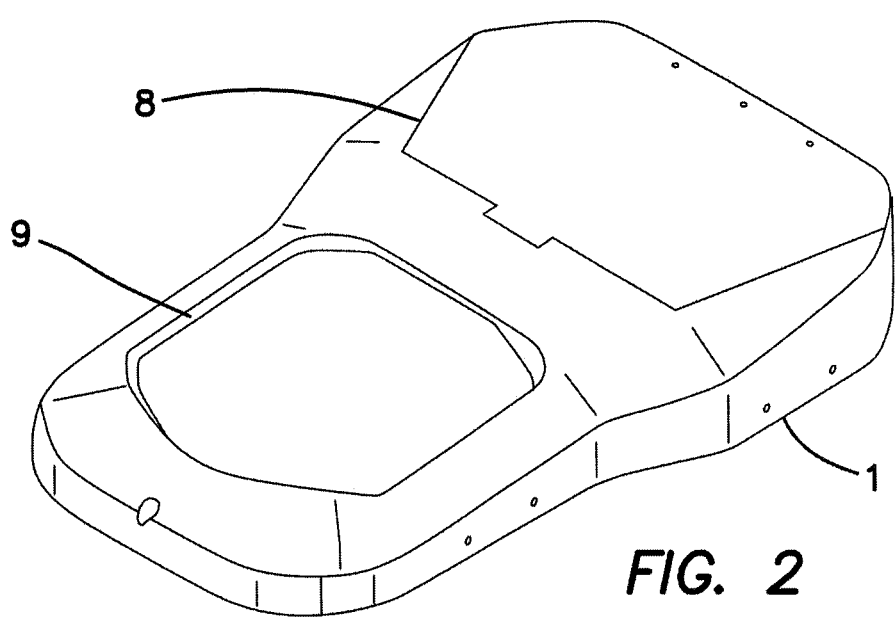
FIG. 2 illustrates a top perspective view of a top cover of the trainer according to the present invention.

As shown in FIG. 2, another embodiment of the top cover 8 has an opening 9 adapted to accept other embodiments of inserts, for example, a foam pad to simulate the skin or several layers of skin and tissue. In another embodiment, the insert may contain multiple layers of foam or other suitable material, preferably color-coded to simulate the various layers of the abdominal wall.

Figure 3:
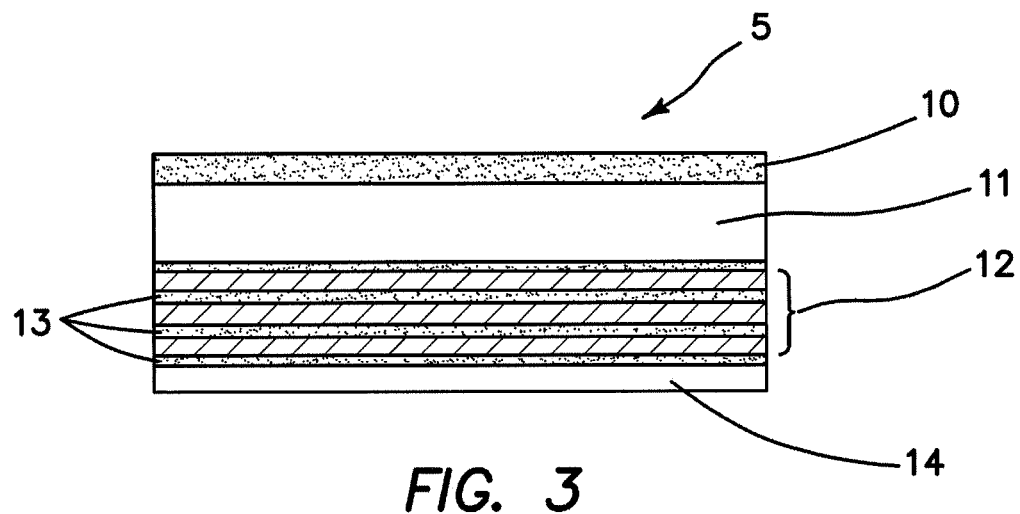
FIG. 3 illustrates a side view of an insert adapted to simulate a cross-section of the abdominal wall according to the present invention.

A schematic of a pad or insert 5 simulating the abdominal wall is shown in FIG. 3. In this variation of the insert 5, multiple layers of foam or foam-like material are used to simulate the appearance, texture and density of the various layers of the abdominal walls. For example, a top layer 10 simulating the skin may be fashioned from a pink, beige, tan, brown or black material. One suitable material is the beige/tan, orange or pink foam sheets by CREATIVE HANDS®, available in 2 mm thickness sheets.

A second layer 11 may be added to the pad, simulating a subcutaneous fat layer. One suitable material for this layer is seat cushion foam, available at most fabric stores in one-inch thick sheets. Alternatively, two to three sheets of closed cell packing material, available as padded wrap from most hardware stores in approximately ⅛-inch thick sheets, may be used.

A third layer 12 of one or more sheets is added to the pad to simulate the muscle layers of the abdominal wall. One suitable material for this layer is Red Foamie CREATIVE HANDS® Foam, preferably two to three sheets stacked together. Preferably, two to three layers of simulated muscle as used in the pad.

A fourth layer or layers 13 of simulated fascia may be disposed between the simulated muscle layers 12. One suitable material for the simulated fascia is thin dish pack, available at most office supply or hardware stores.

A fifth layer 14, simulating the pre-peritoneal fat layer, may also be fashioned from two to three sheets of closed cell packing material.

As described herein, an insert simulating an abdominal wall can be used to train operators on the proper technique for inserting a trocar. In particular, the use of optical trocars allows the visualization of the insertion process into the skin, and protrusion into the abdominal cavity. Using a camera or endoscope adapted to focus on the tip of the trocar, users can track the progress of the trocar insertion through the various layers of the simulated abdominal wall on the display monitor of the trainer.

Figure 4:
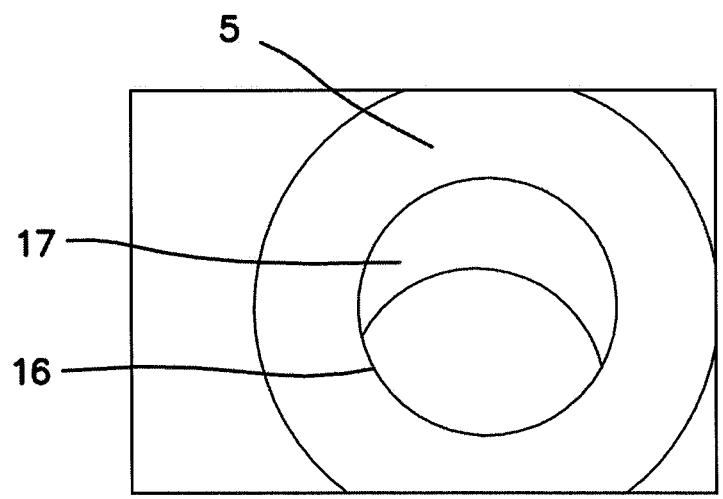
FIG. 4 illustrates a partial top perspective view of an insert having a circular opening according to the present invention.
Figure 5A:
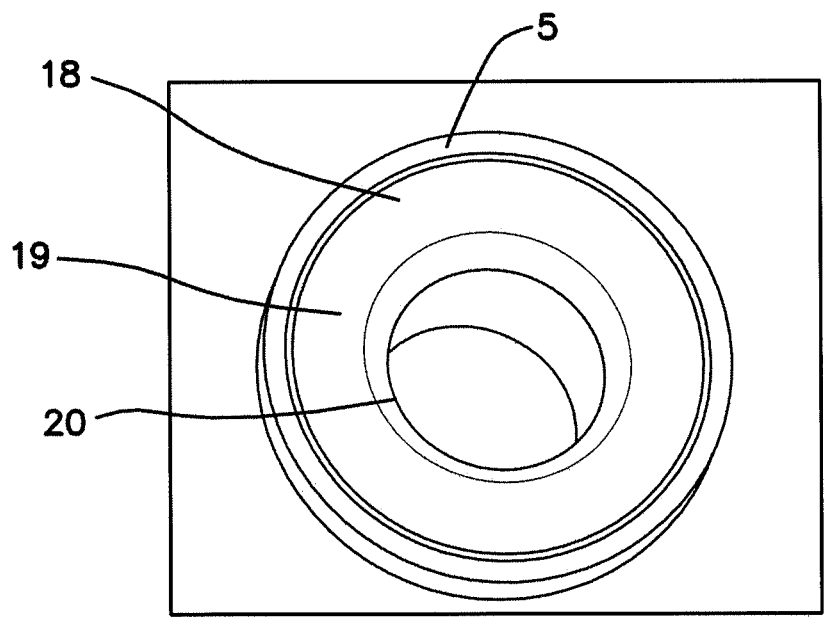
FIG. 5A illustrates a top perspective view of an insert having a circular opening according to the present invention.
Figure 5B:
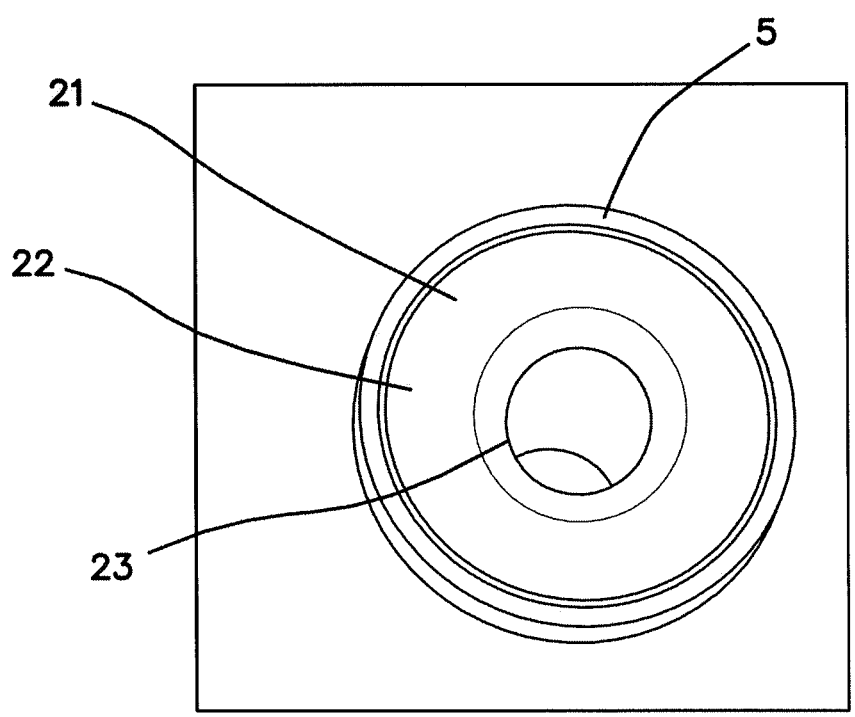
FIG. 5B illustrates a top perspective view of an insert having a circular opening according to the present invention.

FIG. 4 shows a close-up view of another variation of an insert 5 having a large circular opening 16 adapted to accept a hand-access device or single-site device. Since the use of a hand-access device in a non-clinical training environment requires the insert to be stable and rigid, the edge 17 will feel un-natural to the trainee when it is contacted by the trainee during use. Similarly, the use of a single-site device on simulated tissue will feel rigid and un-natural to the trainee when the edge 17 is touched with laparoscopic tools during use in a training environment. To provide a more natural feel, FIG. 5A illustrates a retractor 18 placed inside the opening 16 of an insert 5 or directly into an opening 7 of the top cover 1 of the trainer. The retractor 18 includes an annular ring 19 that provides a softer, more natural-feeling edge 20. Similarly, FIG. 5B illustrates a retractor 21 that has a smaller diameter annular ring 22 to provide a softer, more natural-feeling edge 23. In one variation, the annular ring 19, 22 is formed from silicone, but as the skilled practitioner will note, other materials that simulate the tactile feel and density of a wound incision site, particularly one protected by a wound retractor, can be used. The retractor 18 with a larger diameter opening is particularly useful with a hand-access device, while the retractor 21 with a smaller diameter opening is particularly useful with a single-site device. A single-site device is an access portal inserted into a single incision in the patient typically made at the navel through which an endoscope and other surgical hand instruments are inserted to perform advanced, minimally invasive laparo-endoscopic surgery.

Figure 6:
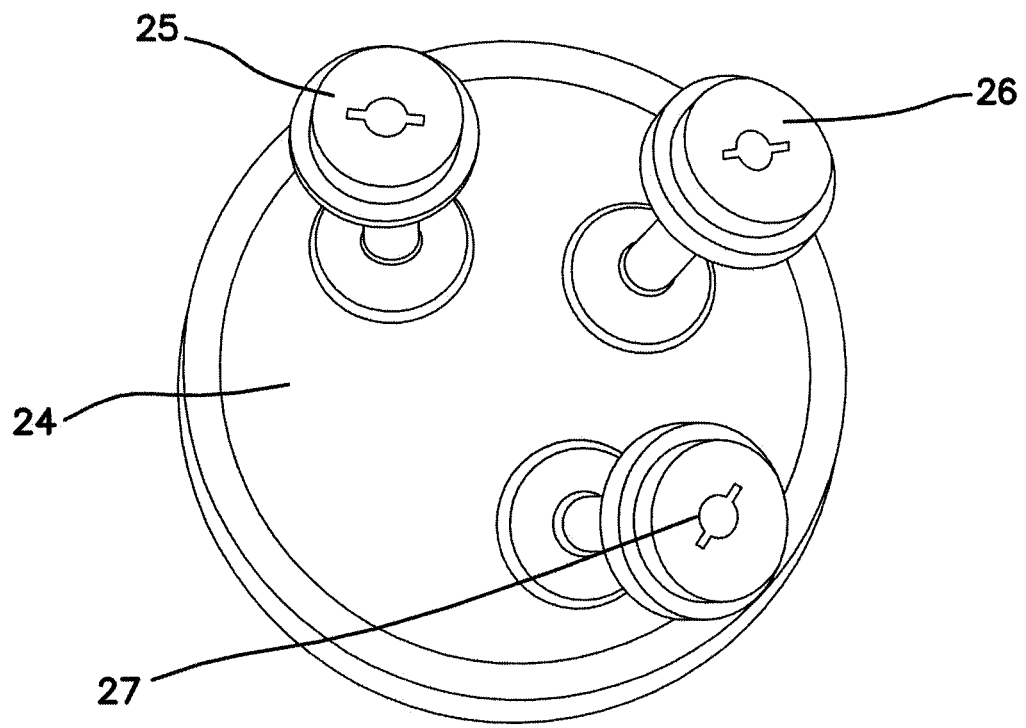
FIG. 6 illustrates a top perspective view of a single-port device in an insert according to the present invention.

FIG. 6 shows a single-site device 24 that is secured to the insert retractor 21 of FIG. 5B. An endoscope and working tools such as graspers, scissors, etc. are inserted through the trocar ports 25, 26, 27 to enter the trainer cavity. As the user manipulates the endoscope camera and hand tools within the confines of the trocar ports 25, 26, 27, the tools and/or camera may contact the edge 23 of the retractor 21 which will now feel more natural, while the underlying surface of the insert 5 or large opening 7 will still provide sufficient rigidity to provide mechanical support for the single-site device 24 or hand-access device during use.

Figure 7:
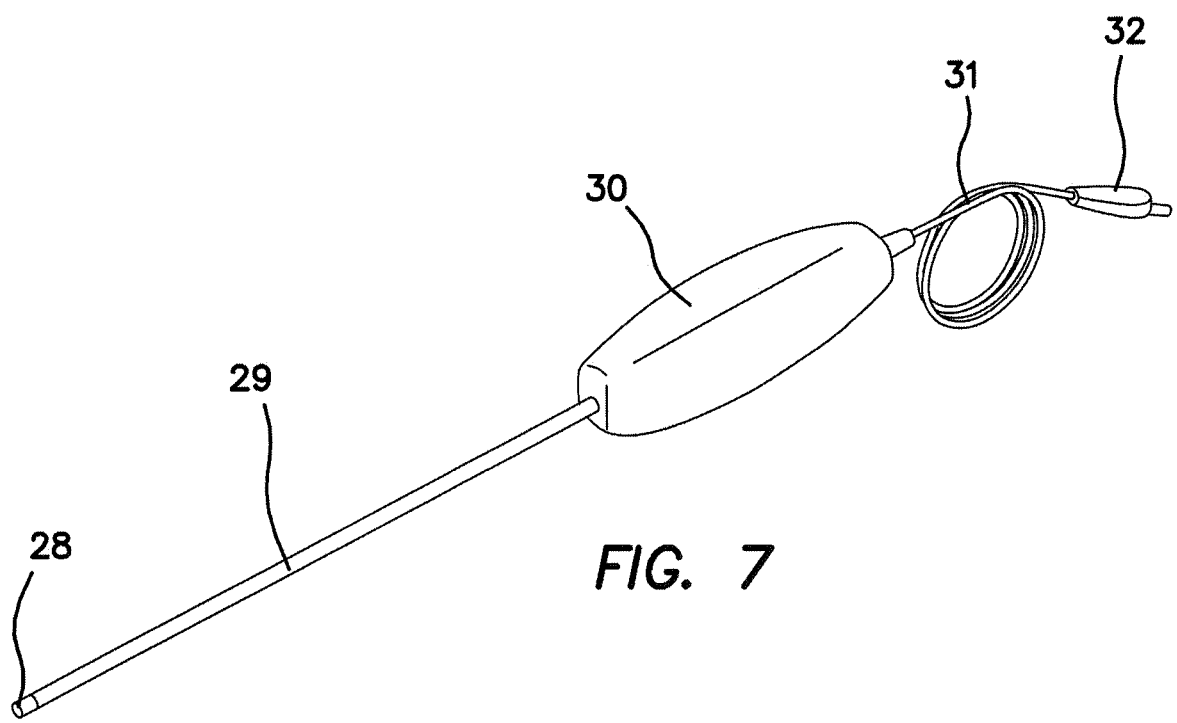
FIG. 7 illustrates a top perspective view of an endoscope according to the present invention.

FIG. 7 shows a schematic drawing of a laparoscope that is part of the laparoscopic trainer disclosed in this invention. The laparoscope comprises a camera 28 that is mounted at the distal end of a shaft 29, which connects to a handle 30. The camera 28 is powered, and the video signal is fed through cable 31, which terminates in a plug 32 for connection to a computer, video display, and power source. Plug 32 connects to the directly to the trainer, where it connects to electrical power and a monitor display. The electrical power source may be external or internal to the trainer.

Figure 8:
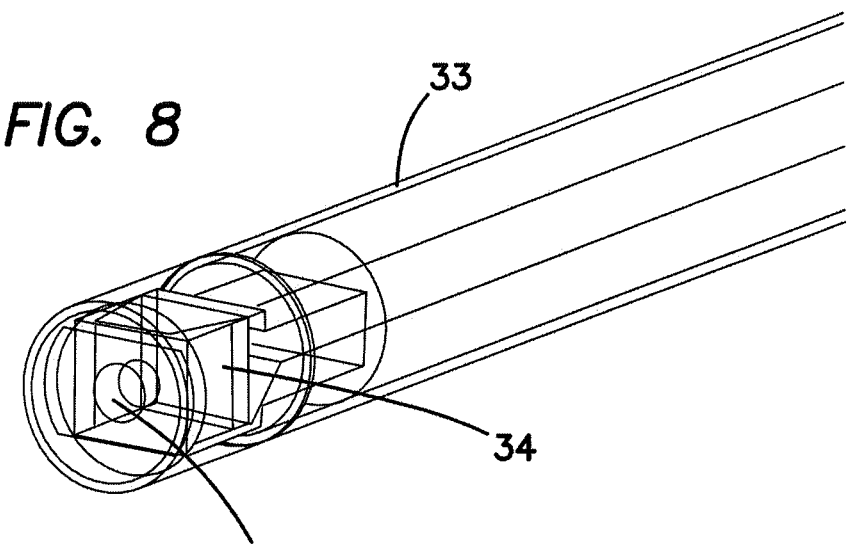
FIG. 8 illustrates a perspective, partially transparent view of a distal end of an endoscope according to the present invention.
Figure 9A:
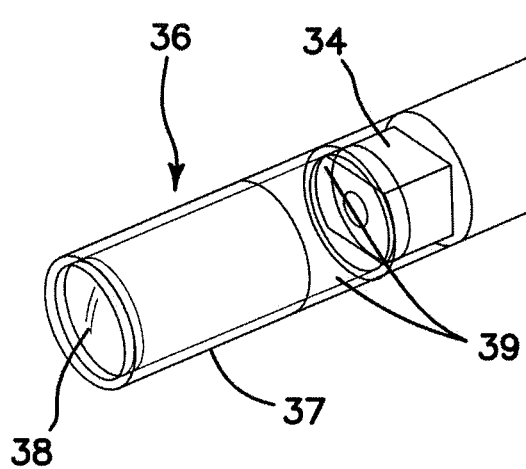
FIG. 9A illustrates a perspective, partially transparent view of a lens assembly tip according to the present invention.
Figure 9B:
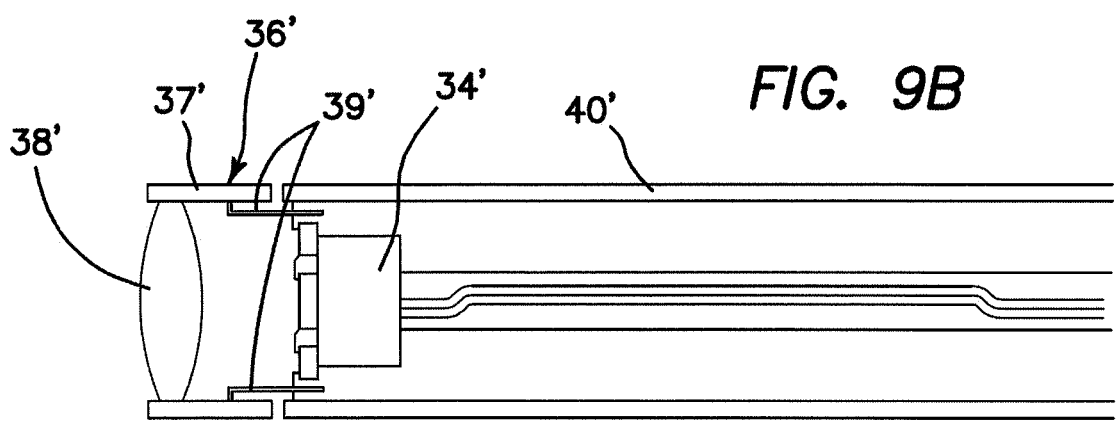
FIG. 9B illustrates a cross-sectional view of a lens assembly tip attached to a distal end of an endoscope according to the present invention.
Figure 10A:
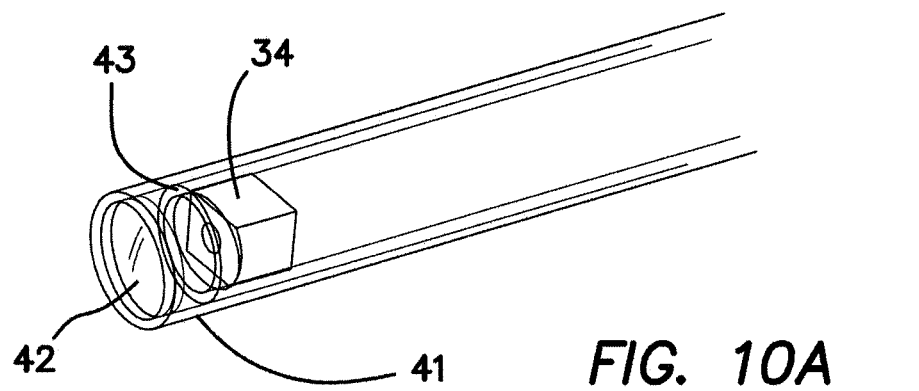
FIG. 10A illustrates a perspective, partially transparent view of a sleeve on a distal end of an endoscope according to the present invention.
Figure 10B:
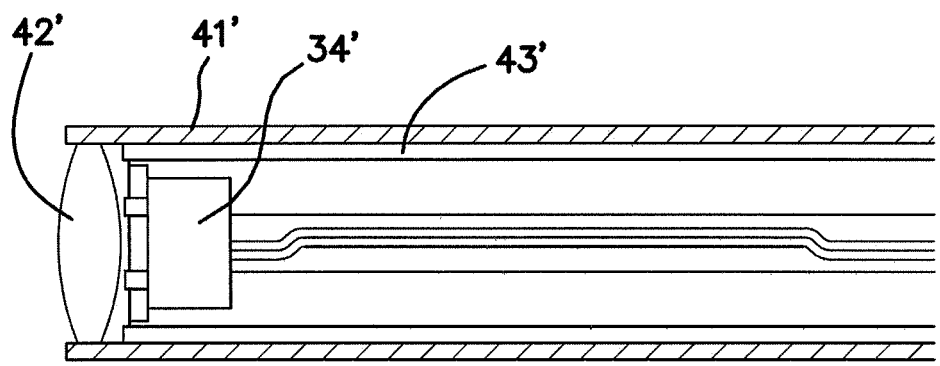
FIG. 10B illustrates a cross-sectional view of a sleeve on a distal end of an endoscope according to the present invention.

As shown in FIG. 8, the distal end of the camera shaft 33 houses a CMOS or CCD-based camera 34 which incorporates a lens system to provide for a focal depth of 4-inches to infinity, although the typical working focal depth for the trainer is approximately four to six inches. The scope tip 35 also incorporates light emitting diodes (LEDs) to enhance illumination during general use. The scope is insertable into optical trocars having a transparent distal end for viewing the insertion of the optical trocar through simulated tissue of the trainer where all ambient light is blocked. In such a case, the illumination at the tip of the scope provided by the LEDs is helpful for viewing the procedure. In addition to illumination, the visualization of the optical trocar insertion procedure also requires that the focal depth of the camera is reduced to about 5 to 10 mm, preferably about 7 mm, which is the typical distance between the tip of the scope and the tip of the obturator when the scope is inserted inside the optical trocar. In one variation of the present invention, the change in the focal length of the camera is achieved by adding a lens assembly tip or cap 36, 36' to the end of the scope. The lens assembly tip 36, 36' of the camera 34, 34' is shown in FIGS. 9A and 9B, respectively, where a lens 38, 38' is mounted to a tube 37, 37' that connects via connecting pins 39, 39' to the scope shaft 40, 40'. In one variation, the lens assembly tip 36, 36' is attached to the scope shaft 40 by screw threads or a snap-fit engagement so that the lens assembly does not detach when the scope is retracted from the obturator after insertion into the simulated skin. It should be noted that while FIGS. 9A and 9B show the lens assembly tip 36, 36' as external to the scope shaft 40 the lens assembly tip 36, 36' is disposed entirely within the scope shaft 40 in another variation. In yet another variation, the change in the focal length of the camera is achieved by mounting a lens 42, 42' to the end of a thin sleeve 41, 41' that is pulled over the scope shaft 43, 43', as shown in FIGS. 10A and 10B, respectively.

In either of the two embodiments described above, it will be appreciated by one of skill in the art that the trainer scope/camera can quickly and easily be converted from use with a single-site or hand-access device, wherein the operative focal depth is approximately 4 to 6 inches, to use with an optical trocar to monitor insertion through a simulated abdominal wall, wherein the operative focal depth is approximately of 5 to 10 mm, by either snapping or threading a tip onto the end of the scope or by sliding a sleeve over the shaft of the scope.

Figure 11:
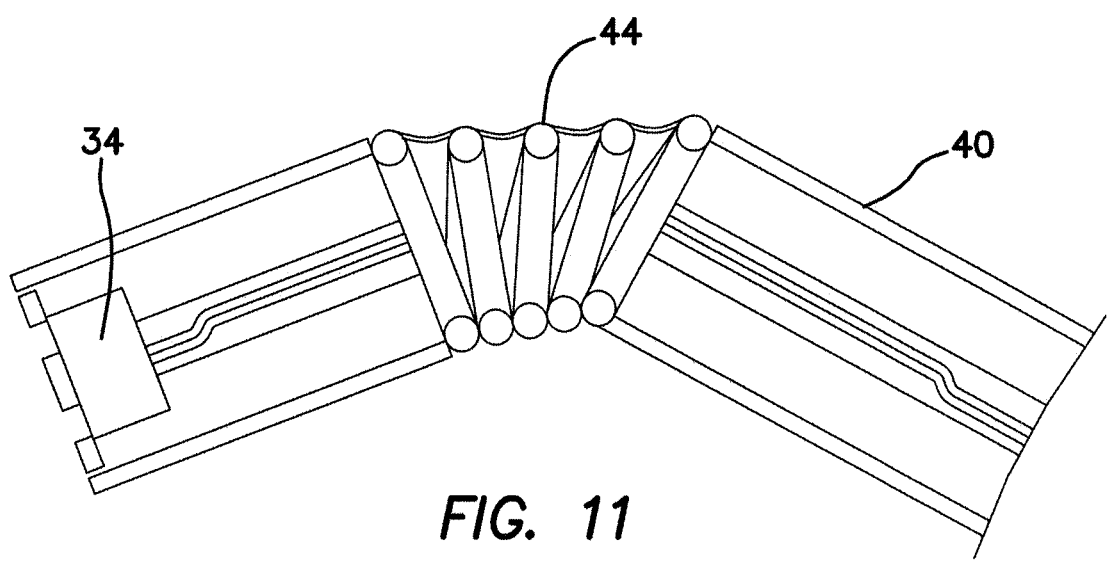
FIG. 11 illustrates a cross-sectional view of a distal end of an endoscope with a flexible tip according to the present invention.

FIG. 11 shows yet another embodiment of the present invention, wherein the distal end of the shaft housing the camera 34 and/or LEDs can be connected via a flexible connector 44 to the remainder of the scope shaft 40 for variable angulation of the distal end of the scope. In another variation, the distal end of the scope is fixed at an angle of approximately 30 or 45 degrees with respect to the proximal end of the shaft 40 and in another variation, the distal end of the shaft is not angled with respect to the proximal end of the shaft 40 but the optics internal to the shaft 40 are configured to provide a fixed or variable angled field of view.

Figure 12:
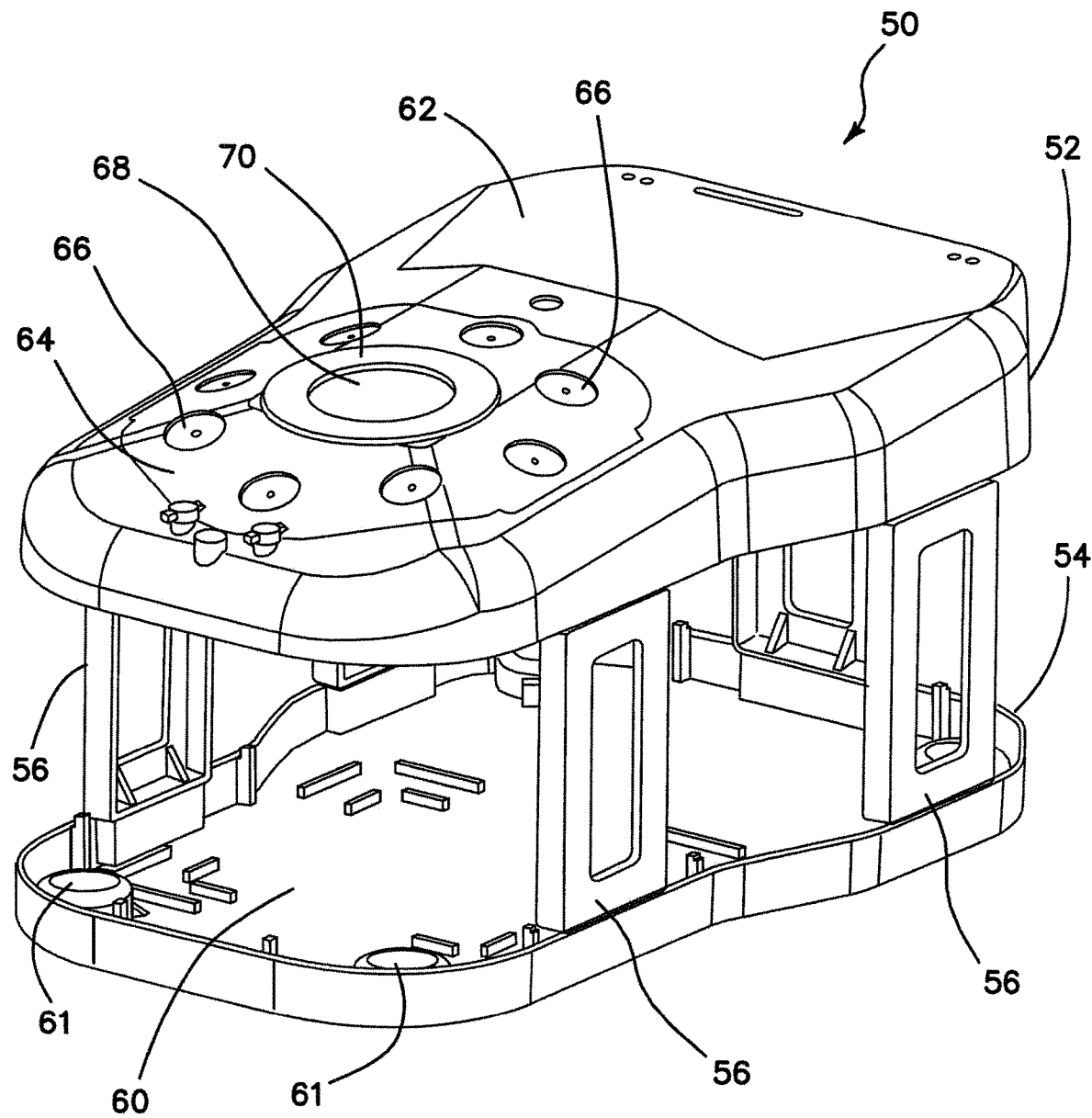
FIG. 12 illustrates a perspective view of another variation of the laparoscopic trainer according to the present invention.
Figure 13:
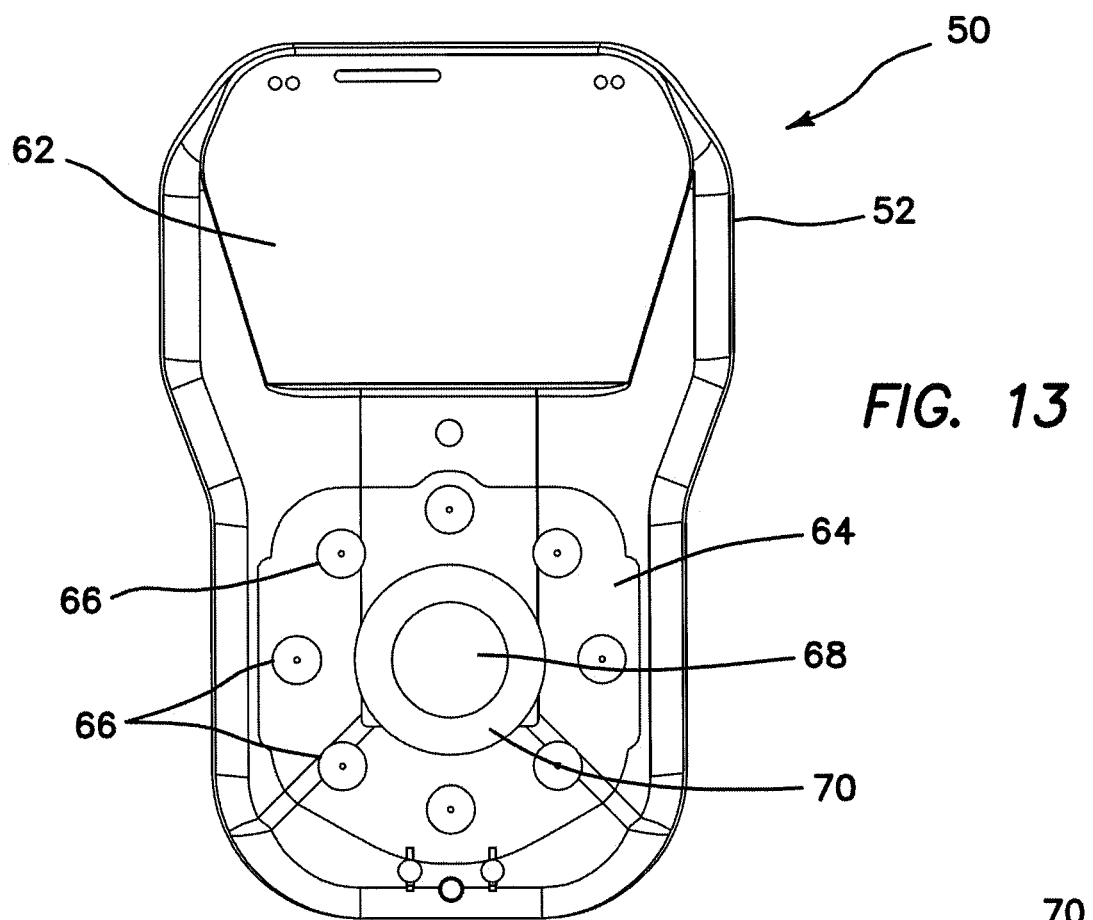
FIG. 13 illustrates a top view of the laparoscopic trainer of FIG. 12 according to the present invention.

Referring now to FIGS. 12 and 13, there is shown a surgical trainer 50 according to the present invention. The endoscopic trainer 50 includes a top cover 52 connected to a base 54 by a plurality of legs 56. The laparoscopic trainer 50 is configured to mimic the torso of a patient such as the abdominal region. The top cover 52 is representative of the anterior surface of the patient and the space between the top cover 52 and the base 54 is representative of an interior of the patient or body cavity where organs reside. The trainer 50 is a useful tool for teaching, practicing and demonstrating various surgical procedures and their related instruments in simulation of a patient. Surgical instruments are inserted into the cavity through pre-established apertures in the top cover 52. Various tools and techniques may be used to penetrate the top cover 52 to perform mock procedures on model organs placed between the top cover 52 and the base 54. The base 54 includes a tray (not shown) for holding simulated or live tissue. The tray is placed in a tray-receiving portion 60 of the base 54. The tray-receiving portion 60 of the base 54 includes frame-like elements for holding the tray in place. To help retain simulated or live organs on the base, a clip attached to a retractable wire is provided at locations 61.

Figure 21:
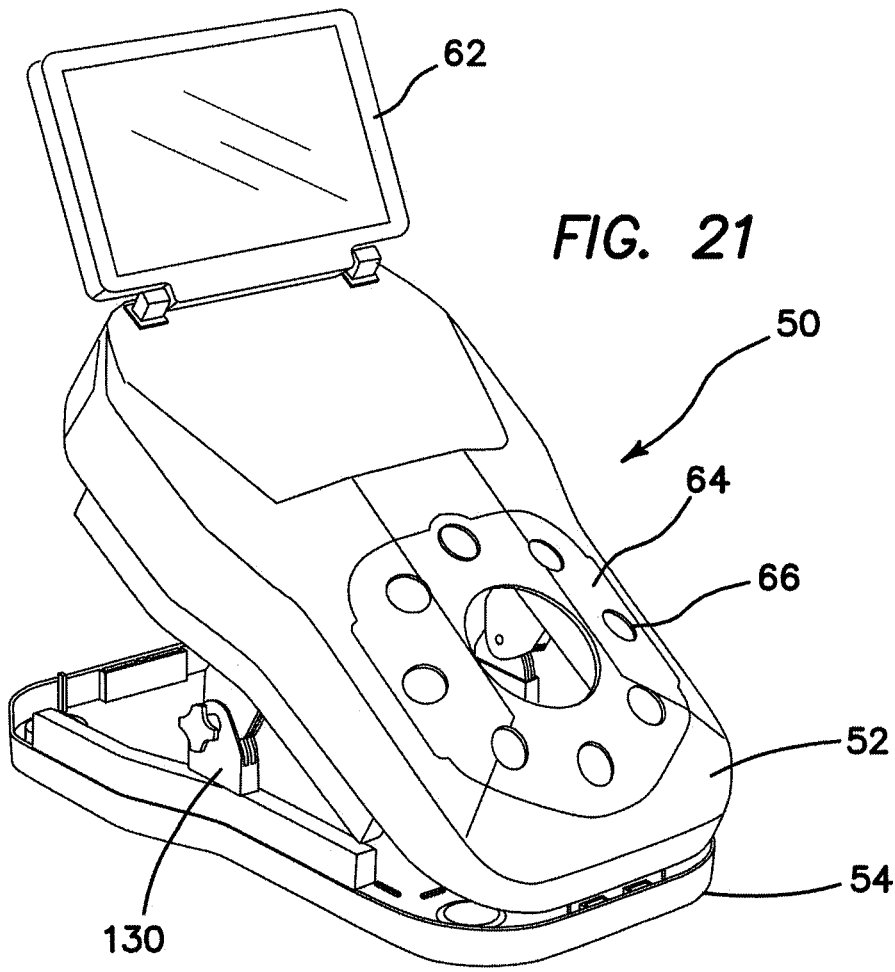
FIG. 21 illustrates a perspective view of a laparoscopic trainer angulated forwardly according to the present invention.
Figure 22:
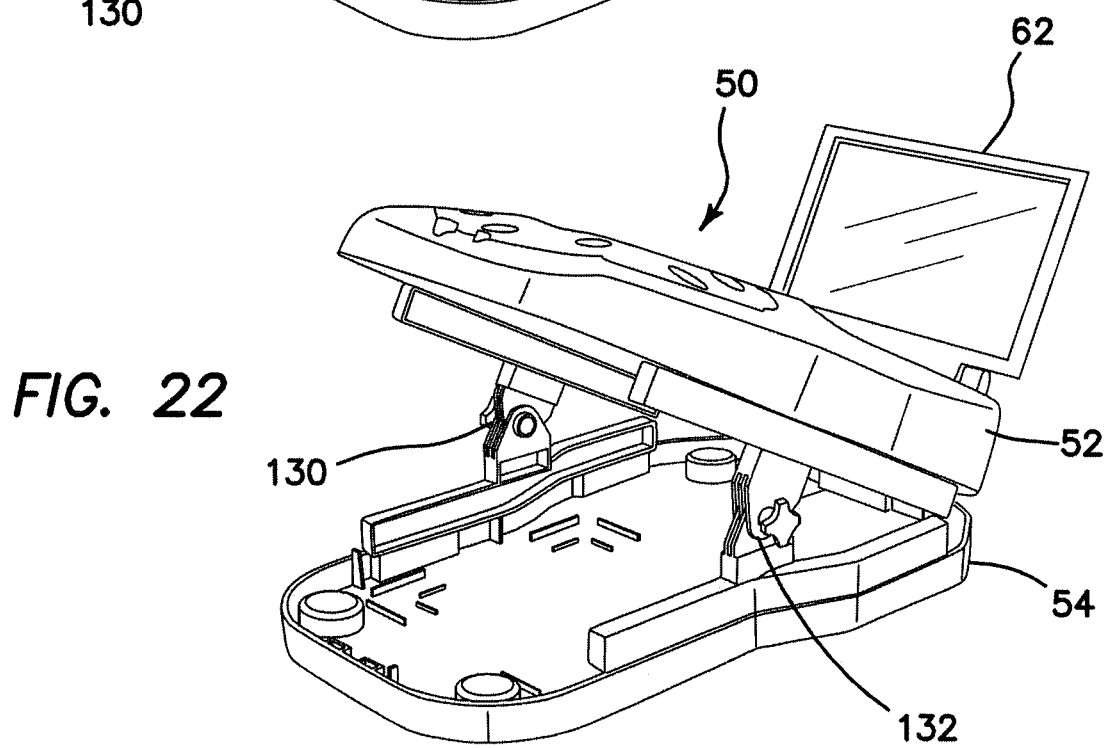
FIG. 22 illustrates a perspective view of a laparoscopic trainer angulated backwardly according to the present invention.

A video display monitor 62 that is hinged to the top cover 52 is shown in a closed orientation in FIGS. 12 and 13 and in an open orientation in FIGS. 1, 21 and 22. The video monitor 62 is connectable to a variety of visual systems for delivering an image to the monitor. For example, an endoscope inserted through one of the pre-established apertures or a webcam located in the cavity and used to observe the simulated procedure can be connected to the video monitor 62 and/or a mobile computing device to provide an image to the user. Also, audio recording or delivery means may also be provided and integrated with the trainer 50 to provide audio and visual capabilities. Means for connecting a portable memory storage device such as a flash drive, smart phone, digital audio or video player, or other digital mobile device is also provided, to record training procedures and/or play back pre-recorded videos on the monitor for demonstration purposes. Of course, connection means for providing an audio visual output to a larger screen other than the monitor is provided. In another variation, the top cover 52 does not include a video display but includes means for supporting a laptop computer, a mobile digital device or tablet such as an IPAD® and connecting it by wire or wirelessly to the trainer.

When assembled, the top cover 52 is positioned directly above the base 54 with the legs 56 located substantially around the periphery and interconnected between the top cover 52 and base 54. The top cover 52 and base 54 are substantially the same shape and size and have substantially the same peripheral outline. Although the trainer 50 has no sidewalls, the legs 56 partially obscure the internal cavity from view from an otherwise open-sided trainer 50. In the variation shown in FIG. 12, the legs include openings to allow ambient light to illuminate the internal cavity as much as possible and also to advantageously provide as much weight reduction as possible for convenient portability. The top cover 52 is removable from the legs 56 which in turn are removable or collapsible via hinges or the like with respect to the base 54. Therefore, the unassembled trainer 50 has a reduced height that makes for easier portability.

Still referring to FIGS. 12 and 13, the top cover 52 includes a first insert 64 removable and replaceable with respect to the top cover 52, in particular, insertable into and removable from an opening formed in the top cover 52. The first insert 64 includes a plurality of apertures 66 to serve as fixed insertion ports for a variety of instruments. The apertures 66 may include various seals. The first insert 64 also includes a tissue simulation region 68 for simulating the skin or several layers of tissue.

In one embodiment, the tissue simulation region 68 is configured as a second insert 70 provided within the first insert 64. The second insert 70 is removable and replaceable via snap-fit, friction fit or threaded engagement or other means with respect to the top cover 52 or with respect to the first insert 64 if provided. In the embodiment shown in FIGS. 12 and 13, the second insert 70 is removable and replaceable with respect to the first insert 64. Of course, one or more second inserts 70 or tissue simulation regions 68 may be provided in the first insert 64 or directly in any location of the top cover 52 with or without the use of a first insert 64. The tissue simulation regions 68 are connected to the top cover 52 and are removable and replaceable.

Figure 14:
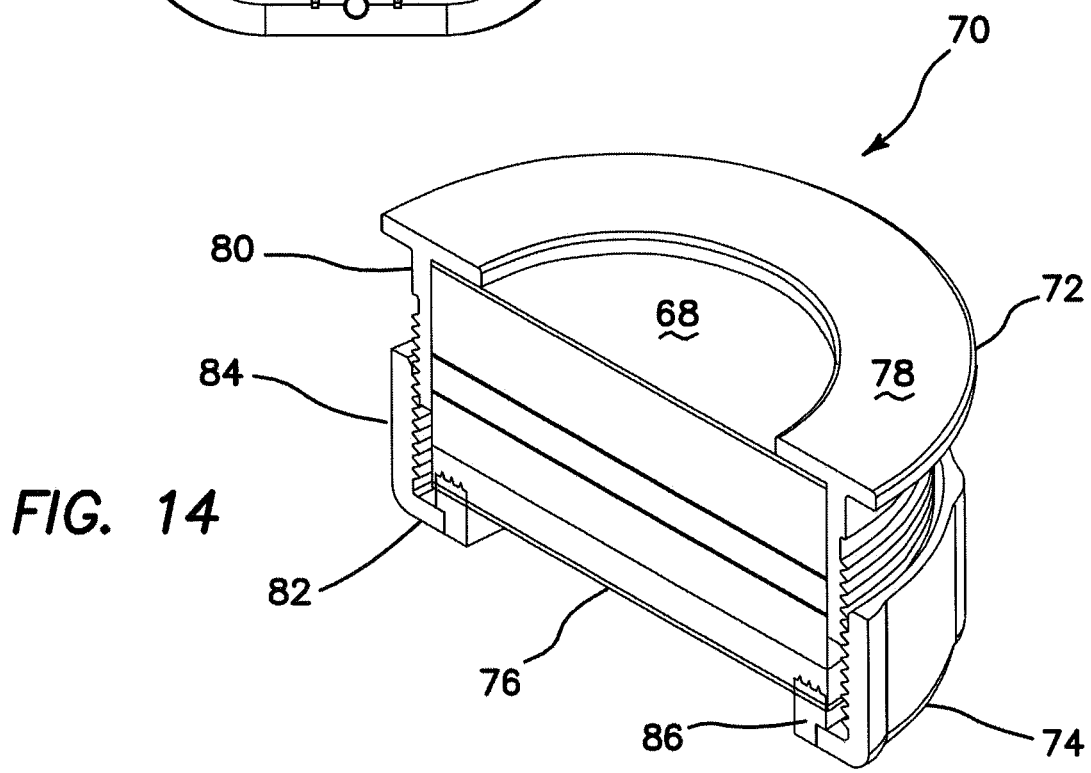
FIG. 14 illustrates a perspective, cross-sectional view of an insert according to the present invention.
Figure 15:
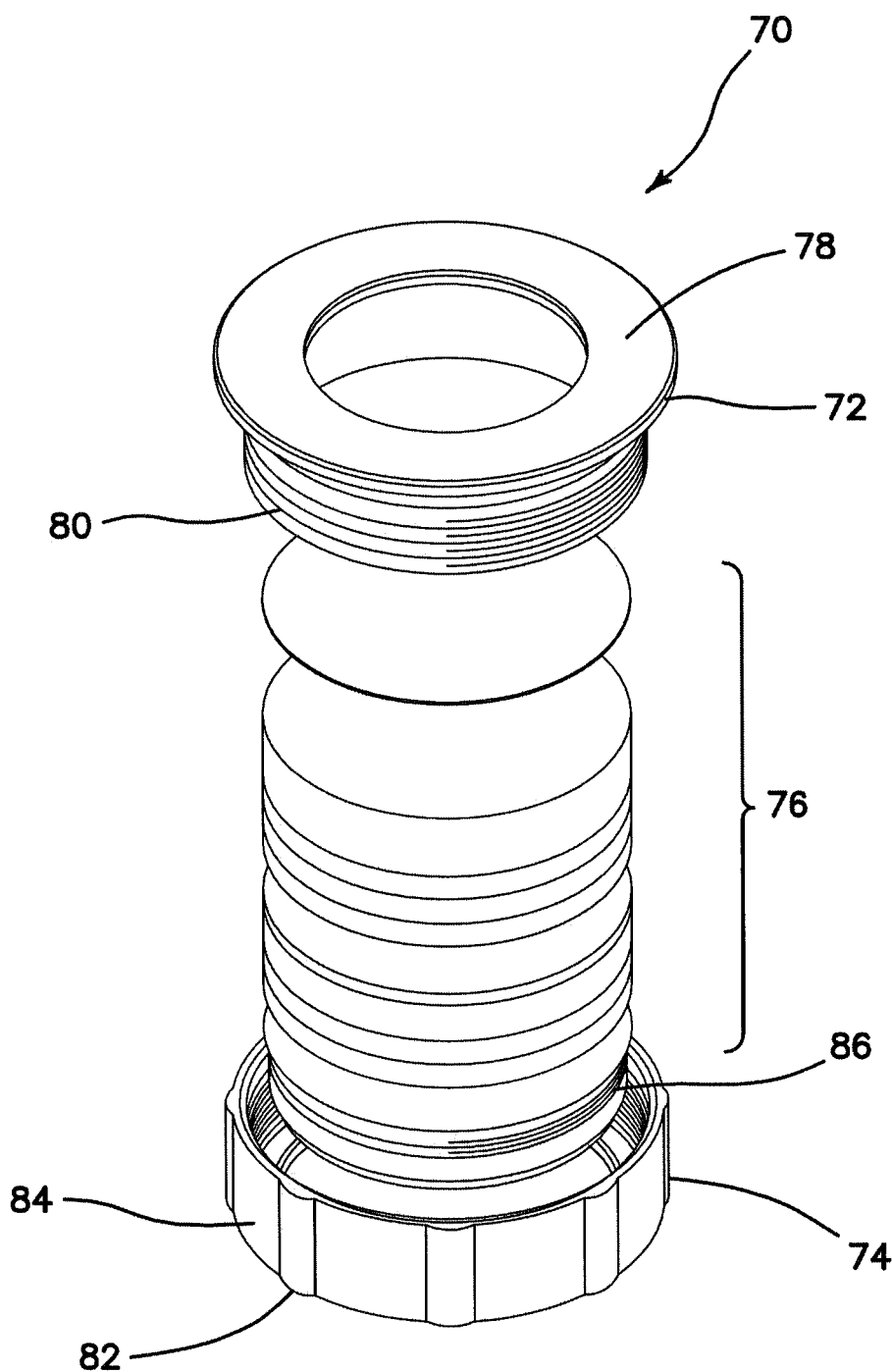
FIG. 15 illustrates an exploded perspective view of an insert according to the present invention.
Figure 17:
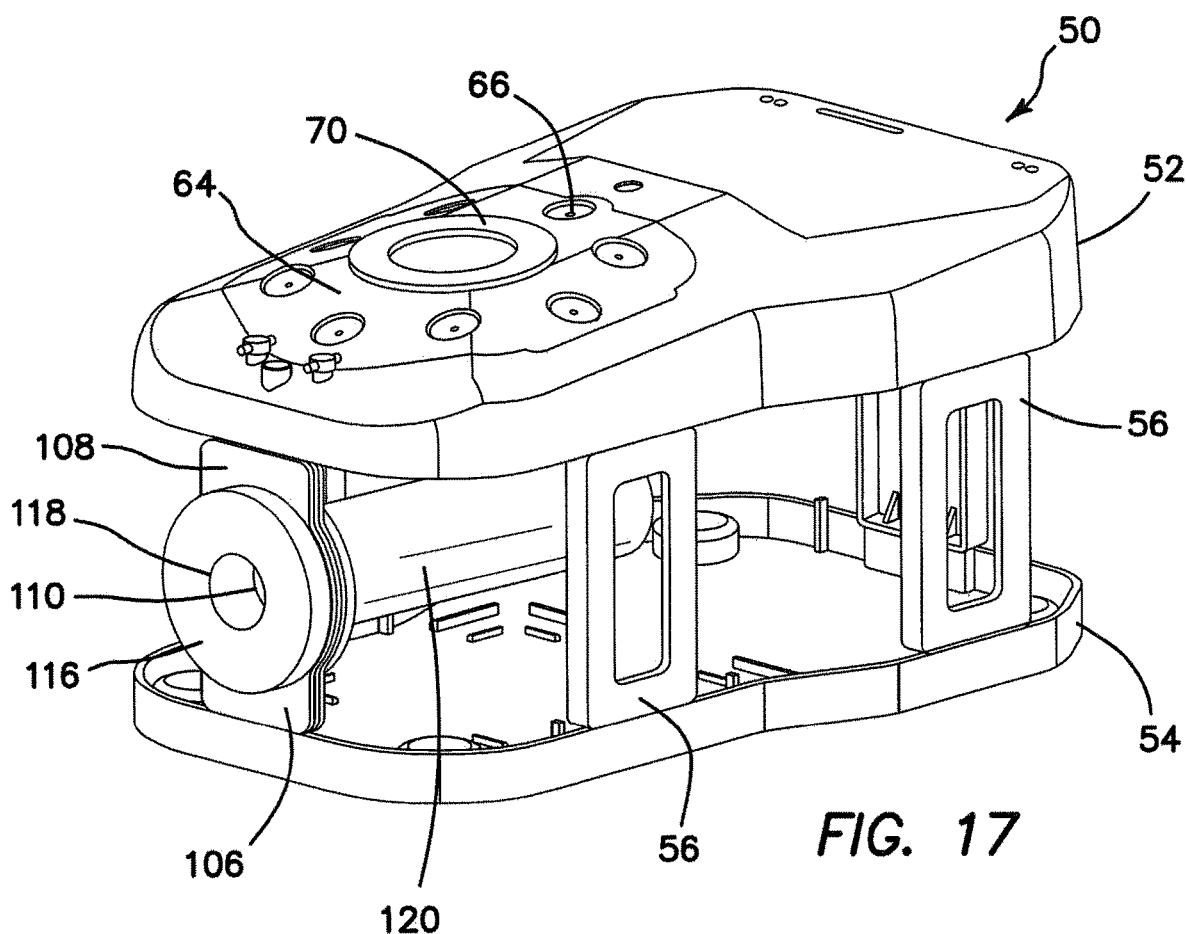
FIG. 17 illustrates a perspective view of a laparoscopic trainer with a leg with an insert and attached tube according to the present invention.

Referring now to FIGS. 14-16, there is shown one variation of the second insert 70. The second insert 70 is generally cylindrical with a circular cross-section although any shape may be used such that the second insert 70 is insertable and removable with respect to a complementarily shaped opening in the top cover 52 or in the first insert 64. The second insert 70 includes a top ring or top portion 72 threadingly connected to a bottom ring or bottom portion 74 forming an encasement with insert material 76 located there between providing a tissue simulation region 68 for the user. The top ring 72 includes a top surface 78 and a sidewall 80 with a threaded outer surface. The top surface 78 extends inwardly to create an upper ledge encompassing an opening. The top surface 78 also extends outwardly to create a lip for resting on the first insert 64 or top cover 52. In one variation, the upper ledge includes at least one downwardly extending projection or spur (not shown) configured to dig into and grip the insert material 76 to help retain it in position. The bottom ring 74 includes a bottom surface 82 and sidewall 84 with a threaded inner surface. The bottom surface 82 extends inwardly to create a lower ledge encompassing an opening to retain, along with the upper ledge, the layers of simulated tissue inside the insert 70. In one variation, the lower ledge includes at least one upwardly extending projection or spur (not shown) configured to dig into and grip the insert material 76 and help retain it in position. In another variation, the insert 70 includes a support ring 86 sized to fit inside the ring structure. The top ring 72 and bottom ring 74 are connected via threads to capture the insert material 76 and support ring 86, if used, inside the ring structure between the upper and lower ledges. The top ring 72 and bottom ring 74 are also connectable via other means such as by snap-fit and interference fit engagement. A portion of the insert material 76 interior of the upper ledge remains exposed and accessible from the top and a portion of the insert material 76 interior of the lower ledge is exposed and accessible and visible from the bottom. The exposed portions are suitable for practicing penetration of tissue with various instruments such as trocars, scalpels and the like. The second insert 70 is insertable into a complementary shaped aperture in the top cover 52 or, in an alternative variation, the first insert 64 and is securely but removably connected thereto. The insert material 70 simulates a penetrable tissue layer through which instruments may be passed to access the body cavity to practice various procedures on simulated organs and the like located in the simulated body cavity and substantially hidden from view by the top cover 52.

With particular attention to FIGS. 16A and 16B, the insert material 76 is selected to simulate the look and feel of that portion of the human body to be penetrated. A different number of layers having different consistencies, compositions and colors are selected to best simulate the different areas of the human body for which the insert is configured. Alternatively, the insert material 76 may be selected to simulate an access device that provides a penetrable gel or silicone layer through which instruments may be passed. As shown in FIGS. 14-16, multiple layers can be employed to simulate different areas of the human body to be penetrated. For example, in FIG. 16A, multiple layers are shown to simulate abdominal tissue. The first layer 88 is a skin layer, a second layer 90 simulates a subcutaneous fat layer, a third layer 92 represents a fascia layer, a fourth layer 94 represents a muscle layer, a fifth layer 96 represents another fascia layer, a sixth layer 98 represents a pre-peritoneal fat layer, and a seventh layer 100 simulates the peritoneum. The different types of layers have different thicknesses, compositions and colors to closely approximate real abdominal tissue layers. An eighth layer 102 made of ethyl vinyl acetate (EVA) is also included. In this variation, all of the layers are EVA foam layers except for the fat layers which are made of yellow cellulose sponge and the peritoneum layer which is made of clear polyolefin. When backed by the eighth layer 102 of EVA, the polyolefin layer visually and tactilely resembles a real peritoneum while being penetrated by an optical obturator and observed via an endoscope disposed inside the optical obturator whereas the cellulose sponge advantageously provides an irregular look typical of real human fat.

With reference to FIG. 16B, in another variation that simulates abdominal tissue, the insert material 76 comprises a plurality of layers stacked upon each other in which the first layer 88 from the top simulates a skin layer. The first layer 88 is made of tan colored EVA foam. The second layer 90 simulates a subcutaneous fat layer and is made of yellow cellulose sponge. The third layer 92 represents a fascia layer and is made of white EVA foam. The fourth layer 94 represents a muscle layer and is made of red EVA foam. The third layer 92 is adjacent to the fourth layer 94. A fifth layer 96 is a support layer made of translucent foam that is pink in color and made from closed cell polyethylene foam. A sixth layer 98 is another muscle layer and is made of red EVA foam. The translucent pink closed cell polyethylene foam layer is adjacent to the red EVA foam layer. The seventh layer 100 simulates another fascia layer and is made of white EVA foam. The eighth layer 102 represents a peritoneum layer and is made of translucent white closed cell polyethylene foam. The ninth layer 103 is another support layer to visually and tactilely resemble the peritoneum. The ninth layer 103 is made of white EVA foam. The white EVA foam layer is adjacent to the translucent white closed cell polyethylene foam layer. The closed cell polyethylene foam employed in the insert material 76 as a support layer 96 between two muscle layers 94, 98 advantageously provides a realistic haptic response when penetrated by the surgeon using an obturator. The closed cell polyethylene foam layer provides a tactile pop when penetrated. Because endoscopic surgery relies on the visualization of the operative field via an endoscope where the image may be obscured by tissue, blood, fluids and moisture condensation, the surgeon trainee learns to develop a keen haptic sense when certain bodily tissues are handled or penetrated with surgical instruments. The insert material of the present invention provides an effective way for teaching the surgeon to develop that haptic sense. Similarly, the eighth layer 102 that simulates the peritoneum is also made of closed cell polyethylene foam that advantageously provides a realistic haptic feedback to the surgeon trainee that the peritoneum has been penetrated. Because the eighth layer 102 is closer to the bottom of the insert the haptic response is more pronounced compared to the haptic response generated by the polyethylene layer, such as the fifth layer 96, that is cushioned or surrounded by more layers on either side which muffle the haptic response.

The support ring 86 is an optional means to provide support for the insert material 76 and serves to prevent the insert material 76 from being pushed through the opening in bottom ring 74 when an instrument is being inserted. The support ring 86 also provides a degree of compression to the insert material 76 when inserted into the ring structure to simulate the resiliency of real tissue. A support ring 86 is interchangeable and may be substituted with another support ring 86 of different thickness as required to simulate different areas of the body to be penetrated. For example, a thinner insert material 76 representing a thinner tissue layer may necessitate a thicker support ring 86 inserted into the ring structure. Hence, the overall thickness of the second insert is advantageously kept constant whereas the thicknesses of the insert material and support ring may vary as required to simulate the desired tissue characteristics. The support ring 86 provides a thickness adjustment layer for insert material 76 of different thicknesses. The multiple layers of the insert material 76 are connected with glue or other means such as by one or more plastic price tag holders 105 as shown in FIG. 16B that are typically I-shaped and passed through all of the layers to keep them together. In another variation, the multiple layers of insert material 76 are captured in a heat shrink plastic sleeve having an open top and bottom.

A user may select an appropriate insert material 76 and associated support ring 86 for the part of the body to be penetrated. The support ring 86 is first inserted into the bottom ring 74, then, the insert material 76 is placed on top of the support ring 86 either layer-by-layer or as a single biscuit having all the layers connected together with, for example, one or more price tag holders 105 as shown in FIG. 16B. The top ring 72 is then connected to the bottom ring to capture the insert material 76 and support ring 86 there between. The second insert 70 can then be disposed in a corresponding aperture in the top cover 52 of the trainer 50 and connected thereto by threaded, snap-fit, compression-fit or other means known to one having ordinary skill in the art. A user may then demonstrate, practice or teach various procedures using various instruments penetrating the insert material 76 and observing the penetration and procedures via the camera/scope with video images displayed on the video monitor 62. After multiple penetrations of the insert material 76 with the same or different instruments, the user may then remove the second insert 70 from the top cover 52, unscrew the top ring 72 from the bottom ring 74, remove and discard the insert material 76 and insert a new insert material 76 into the ring structure for another demonstration or more practice. The user may carry multiple insert layers 76 of different combinations of constituting layers and reconstruct the second insert 70 as desired without necessitating reconstruction of a larger insert or having to send the insert 70 to the manufacturer to be reconstructed. Of course, in another variation, the entire second insert 70 may be avoided and the first insert 64 fashioned in the same manner as the second insert 70 just described to provide for a larger simulated tissue region.

Referring back to FIG. 12, there is shown a top cover supported above the base by five legs. In one variation, a sixth leg is provided as shown in FIGS. 17-20. The trainer 50 may be assembled with an optional sixth support structure or leg 106 which is configured for simulating transanal endoscopic micro-surgery (TEMS) also known as transanal minimally invasive surgery (TAMIS).

Figure 18:
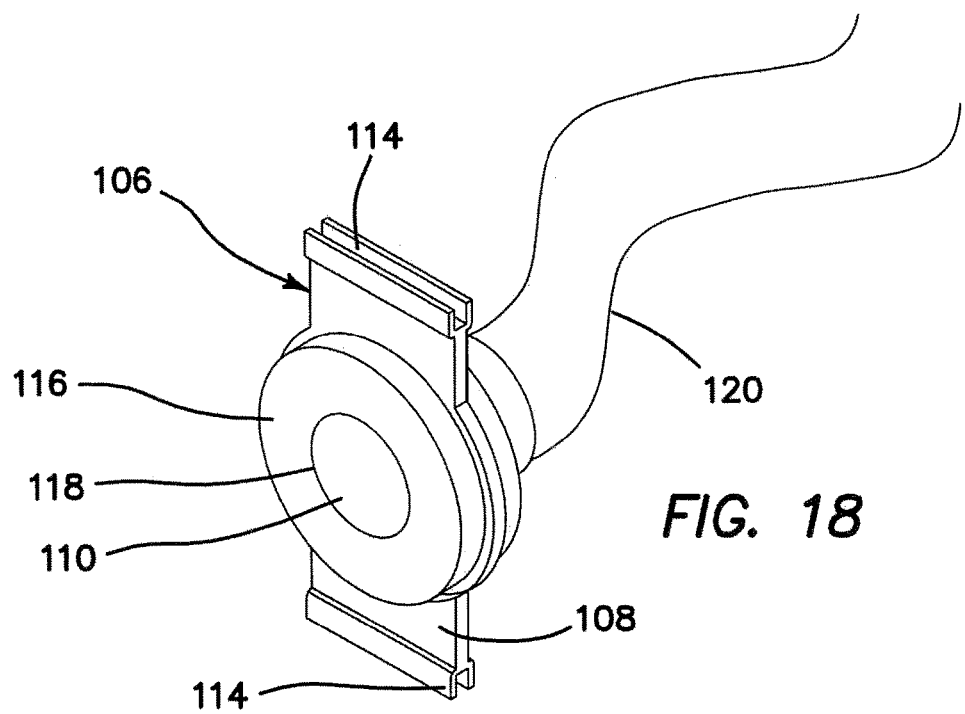
FIG. 18 illustrates a perspective view of a leg with attached tube and insert according to the present invention.
Figure 19:
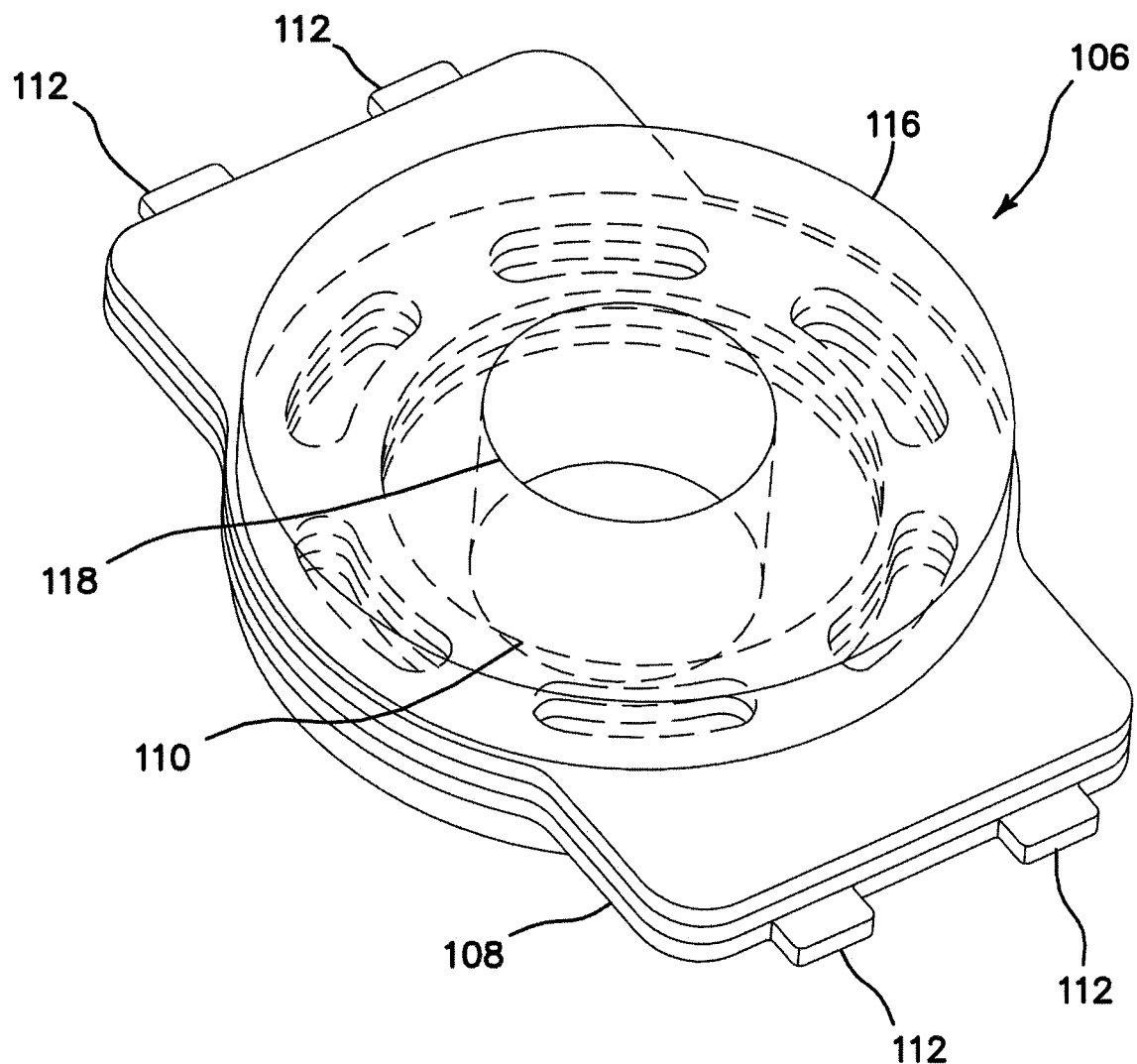
FIG. 19 illustrates a perspective view of a leg with a insert according to the present invention.
Figure 20:
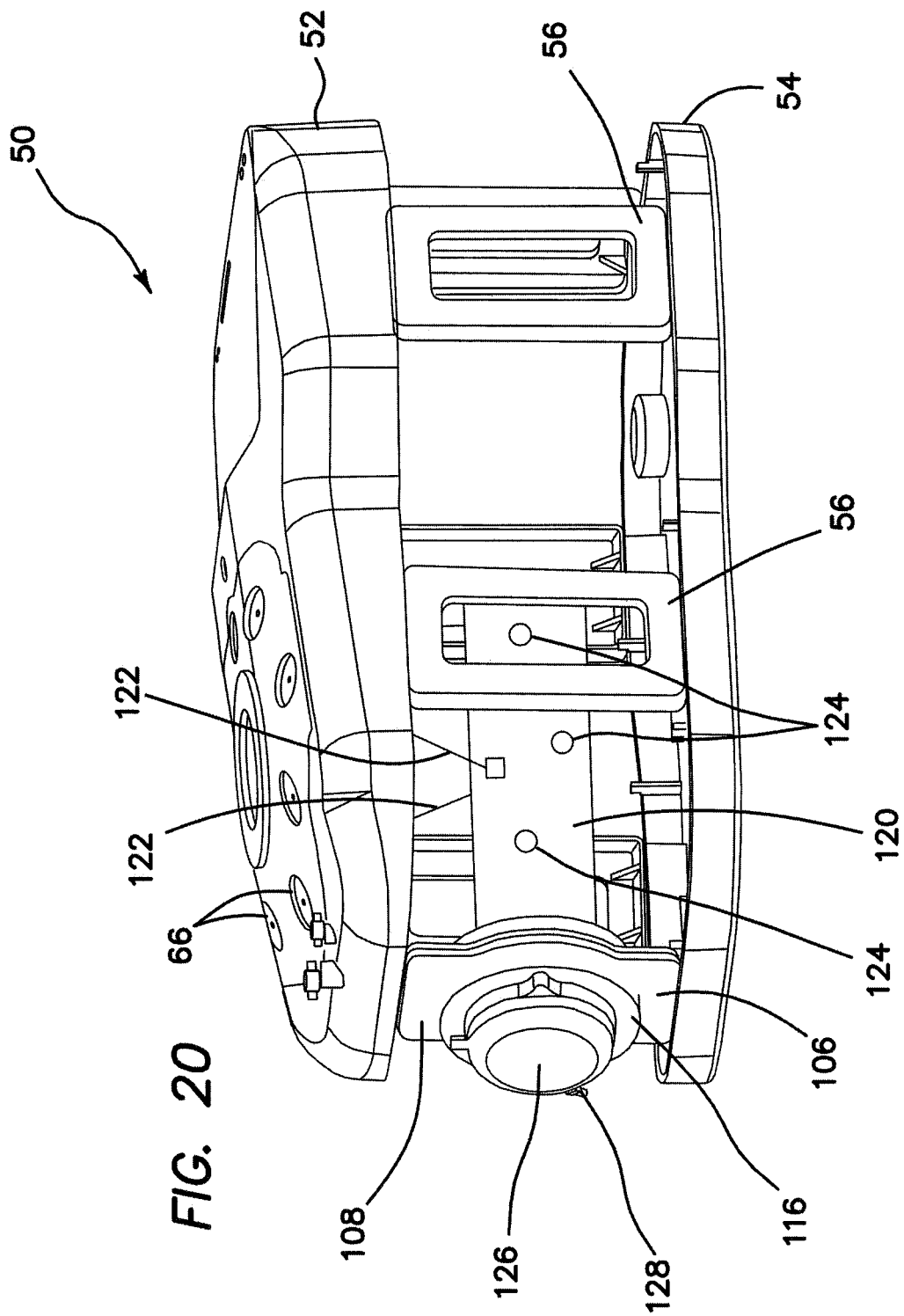
FIG. 20 illustrates a perspective view of a laparoscopic trainer with an access device, insert and tube with artificial tumors according to the present invention.

The TEMS or TAMIS leg 106 includes a flat plate 108 having an inner surface for facing toward the interior of the trainer and an outer surface for facing outwardly towards the user. The plate 108 has an aperture 110 passing through the plate 108 from the inner surface to the outer surface. As shown in FIGS. 18 and 19, the plate 108 also includes means such as tabs 112 or a U-shaped channel 114 for inserting to connect the TEMS or TAMIS leg 106 to the top cover 52 and to the base 54 to help support and space apart the top cover 52. The TEMS or TAMIS leg 106 is provided with a sphincter insert 116 to simulate an anus. The sphincter insert 116 is typically made of silicone to provide a realistic tissue-like interface. The sphincter insert 116 is insertable into the aperture 110 of the leg 106 and includes an aperture 118 coaxial with the plate aperture 110. In another variation, the insert 116 is glued or over molded to the leg 106 such that the insert 116 substantially faces outwardly toward the user. On the inner surface of the leg 106, a tube 120 is connected such that the lumen of the tube 120 is in communication with the aperture 110 of the leg 106 and if a sphincter insert 116 is utilized, the lumen of the tube 120 is connected such that it is in communication with the aperture 118 in the sphincter insert 116. In another variation, a connector (not shown) is attached to the inner surface of the leg 106. The connector is a cylindrically-shaped extension having a radially-extending distal flange. The connector is configured for attaching the tube 120 to the connector by pulling the tube 120 over the distal flange and over the connector which has a connector diameter larger than a relaxed tube diameter to keep the tube 120 secured to the leg 106. The tube 120 may be suspended from the under surface of the top cover 52 with tethered clips 122 connected to the under surface of the top cover 52 as shown in FIG. 20. The tube 120 may be made of inanimate tissue such as a calf colon. Alternatively, the tube 120 is designed to simulate a bowel, intestine or colon and is made of silicone. Artificial tumors 124 illustrated in FIG. 20 are also disposed on the tube 120 so that the user may practice locating and removing them. In one variation, the artificial tumors 125 are darker in color than tube and located inside the tube lumen. At the outer surface of the plate 108, an access device 126 may be provided and inserted into the sphincter insert 116 and into the aperture 110 as shown in FIG. 20. The access device 126 seals the proximal opening of the tube 120 at the leg 106 and provides an insufflation port 128 for delivering insufflation fluid into the tube 120 to expand the tube 120 and create a working space inside the tube 120 to simulate an actual TEMS/TAMIS procedure. If insufflation is employed, a tube 120 with a sealed distal end is provided to contain the insufflation gasses. Simulated insufflation in which a tube 120 is configured to simulate an already inflated colon may be employed without the use of pressurization or gas. Such a tube 120 is configured to be larger and distended as if it were insufflated with gas. The leg 106 advantageously provides a lateral approach to the body cavity of the trainer 50 for yet another range of procedures that require a lateral or anal approach. The leg 106 and accompanying tube attachment is particularly useful for users to practice closing incisions in the tube 120 with sutures performed through the top cover 52 or laterally through the leg 106. A silicone tube does not tear as easily as other materials when closing an incision therein with sutures and provides an ideal practicing environment and medium. Lighting such as LEDs (not shown) attached to the under surface of the top cover 52 is provided to illuminate the body cavity. The trainer 50 is suitable for simulations that are not limited to practicing or demonstrating laparoscopic procedures including gynecological and urological procedures but may also be employed for other surgical procedures requiring a lateral approach including orthopedic applications.

Turning now to FIGS. 21 and 22, another variation of the trainer 50 having a top cover 52 that angulates with respect to the base 54 is shown. This variation includes two legs 130, 132 that connect and separate the top cover 52 and the base 54. The legs 130, 132 are configured to permit the angle of the top cover 52 with respect to the base 54 to be adjusted. The angulation of the trainer advantageously simulates a patient in a Trendelenburg or reverse Trendelenburg position. In the Trendelenbury position the body is tilted such that it is laid flat on the back with the feet higher than the head or vice versa. The Trendelenburg position allows better access to the pelvic organs as gravity pulls the intestines away from the pelvis to thereby prevent encroachment of the intestines upon the pelvic operating field to provide more working space inside the abdominal cavity in which the surgeon can more easily manipulate organs. The degree of tilt of the trainer is approximately 0 to ±60 degrees. The selected angulation is locked by tightening thumbscrews provided on the legs 130, 132. A tray for holding simulated or live tissue inside the simulated cavity is configured to angulate independently with respect to the base as well or connected to the top cover 52 such that angulation of the top cover 52 simultaneously angulates the tissue tray. While FIGS. 21 and 22 show only the top cover 52 angulating with respect to the base 54, another variation provides for angulation of the entire trainer 50 with respect to a table top. Such trainer 50 is provided with tilting means such as one or more jack screws or other height adjustment mechanisms known to a person skilled in the art. The jack screws, for example, are provided in each corner of the base 54 and are adjustable for custom angulation of the entire trainer 50 with respect to a table top. Although FIGS. 21 and 22 depict the trainer 50 angulating forwardly and backwardly, the trainer 50 may also be configured to angulate side to side.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:
1. A surgical training device, comprising:
   a base;
   a top cover having a top surface and a bottom surface; the top cover being connected to and spaced apart from the base to define a substantially open-sided internal cavity having an adjustable height between the top cover and the base; the top cover having a plurality of apertures that serve as fixed insertion ports for instruments; and
   a tilting mechanism imparting angulation to the entire surgical training device with respect to a table top on which it is placed.

2. The surgical training device of claim 1 wherein the plurality of apertures are formed directly in the top cover; the apertures including one or more seals.

3. The surgical training device of claim 1 wherein the top cover includes an opening and an insert sized and configured to fit into the opening of the top cover and connect thereto; the plurality of apertures being formed in the insert.

4. The surgical training device of claim 3 further including a tissue simulation region that is penetrable to access the internal cavity; the tissue simulation region being connected to the insert and the plurality of apertures are fixed with respect to the insert.

5. The surgical training device of claim 1 further including a tissue simulation region that is penetrable to access the internal cavity; the tissue simulation region being connected to the top cover.

6. The surgical training device of claim 1 wherein the top cover includes an opening and the plurality of apertures are located around the opening; the opening being larger than any one aperture of the plurality of apertures, wherein a tissue simulation region being disposed in the opening and connected to the top cover.

7. The surgical training device of claim 1 further including a simulated tissue structure located in a tray; the tray being located in a tray-receiving portion of the base; the tray-receiving portion of the base includes frame-like elements for holding the tray in place.

8. The surgical training device of claim 1 further including a clip attached to a retractable wire provided at one or more location.

9. The surgical training device of claim 1 further including one or more simulated tissue structure located in the cavity.

10. The surgical training device of claim 1 further including a penetrable tissue simulation region in the top cover; the tissue simulation region being configured as a simulated abdominal wall.

11. The surgical training device of claim 1 wherein the top cover is further configured to angulate with respect to the base.

12. The surgical training device of claim 1 wherein the top cover and the base are interconnected via a height-adjustable connecting mechanism.

13. The surgical training device of claim 12, wherein the height-adjustable connecting mechanism comprises a plurality of collapsible hinges.

14. The surgical training device of claim 12, wherein the height-adjustable connecting mechanism comprises a plurality of legs disposed substantially around the periphery and interconnected between the top cover and the base, wherein each of the plurality of legs comprises an opening.

15. The surgical training device of claim 14, wherein the top cover is removable from the plurality of legs, whereas the plurality of legs are collapsible or removable with respect to the base.

16. A surgical training device comprising:
   a base; and
   a top cover connected to and spaced apart from the base by at least one leg to define an internal cavity between the top cover and the base, the at least one leg being configured to allow angulation of the top cover with respect to the base, wherein an angle between respective planes of the top cover and the base is selectably adjustable so as to simulate a patient in a Trendelenburg position or a reverse Trendelenburg position, the selectable angle between the top cover and the base being adjustable within a range of 0° to 60°, and wherein the top cover is configured to angulate forwardly or backwardly with respect to the base.

17. The surgical training device of claim 16 wherein the at least one leg is further provided with a locking mechanism configured to lock the selectable angle.

18. The surgical training device of claim 16 further comprising a tray for holding simulated or live tissue inside the internal cavity, the tray being configured to angulate independently with respect to the base.

19. The surgical training device of claim 16 further comprising a tray for holding simulated or live tissue inside the internal cavity, the tray being connected to the top cover so as to simultaneously angulate with the top cover with respect to the base.

20. A surgical training device comprising:
   a base;
   a top cover connected to and spaced apart from the base by at least one leg to define an internal cavity between the top cover and the base, the at least one leg being configured to allow angulation of the top cover with respect to the base, wherein an angle between respective planes of the top cover and the base is selectably adjustable so as to simulate a patient in a Trendelenburg position or a reverse Trendelenburg position, the selectable angle between the top cover and the base being adjustable within a range of 0° to 60°; and
   a tray for holding simulated or live tissue inside the internal cavity, the tray being connected to the top cover so as to simultaneously angulate with the top cover with respect to the base.

* * * * *